United States Patent
Yukinobu et al.

(10) Patent No.: US 6,558,581 B2
(45) Date of Patent: May 6, 2003

(54) TRANSPARENT ELECTRO-CONDUCTIVE STRUCTURE, PROCESS FOR ITS PRODUCTION, TRANSPARENT ELECTRO-CONDUCTIVE LAYER FORMING COATING FLUID USED FOR ITS PRODUCTION, AND PROCESS FOR PREPARING THE COATING FLUID

(75) Inventors: Masaya Yukinobu, Chiba (JP); Kenji Kato, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 135 days.

(21) Appl. No.: 09/867,473

(22) Filed: May 31, 2001

(65) Prior Publication Data

US 2001/0032968 A1 Oct. 25, 2001

Related U.S. Application Data

(62) Division of application No. 09/175,978, filed on Oct. 21, 1998, now Pat. No. 6,261,479.

(30) Foreign Application Priority Data

| Oct. 23, 1997 | (JP) | 9-309350 |
| Oct. 23, 1997 | (JP) | 9-309351 |
| Nov. 17, 1997 | (JP) | 9-332400 |
| Nov. 17, 1997 | (JP) | 9-332401 |

(51) Int. Cl.$^7$ ............ H01B 1/02; C01G 5/00; C01G 7/00; C09D 5/24

(52) U.S. Cl. ............ 252/514; 252/514; 428/403; 428/434; 428/924; 423/22; 423/23; 106/1.13; 106/1.15; 106/1.23; 106/1.28

(58) Field of Search ............ 252/514; 428/403, 428/434, 924; 423/23, 22; 106/1.13, 1.15, 1.23, 1.28

(56) References Cited

U.S. PATENT DOCUMENTS

| 3,923,612 A | * | 12/1975 | Wiesner | 205/247 |
| 4,337,091 A | * | 6/1982 | El-Shazly et al. | 106/1.23 |
| 5,785,897 A | * | 7/1998 | Toufuku et al. | 252/514 |

FOREIGN PATENT DOCUMENTS

| EP | 0649160 A1 | 4/1995 |
| EP | 0803551 A2 | 10/1997 |
| JP | 7-282745 A | 10/1995 |
| JP | 8-77832 | 3/1996 |
| JP | 9-55175 A | 2/1997 |
| JP | 9-55175 | 2/1997 |
| JP | 9-115438 A | 5/1997 |
| JP | 09115438 | * 5/1997 | H01J/9/20 |
| JP | 09286936 A | 11/1997 |

* cited by examiner

*Primary Examiner*—Mark Kopec
*Assistant Examiner*—Kallambella Vijayakumar
(74) *Attorney, Agent, or Firm*—Armstrong, Westerman & Hattori, LLP

(57) ABSTRACT

A transparent electro-conductive structure comprising a transparent substrate and formed successively thereon a transparent electro-conductive layer and a transparent coat layer, which is used in, e.g., front panels of display devices such as CRTs. The transparent electro-conductive layer is composed chiefly of i) noble-metal-coated fine silver particles having an average particle diameter of from 1 nm to 100 nm, the fine silver particles being surface-coated with gold or platinum alone or a composite of gold and platinum, and ii) a binder matrix.

A transparent electro-conductive layer forming coating fluid used in the production of this transparent conductive structure comprises a solvent and noble-metal-coated fine silver particles dispersed in the solvent and having an average particle diameter of from 1 nm to 100 nm, the fine silver particles being surface-coated with gold or platinum alone or a composite of gold and platinum.

10 Claims, 9 Drawing Sheets

TRANSPARENT ELECTRO-CONDUCTIVE STRUCTURE, PROCESS FOR ITS PRODUCTION, TRANSPARENT ELECTRO-CONDUCTIVE LAYER FORMING COATING FLUID USED FOR ITS PRODUCTION, AND PROCESS FOR PREPARING THE COATING FLUID

This appication is a division of prior application Ser. No. 09/175,978 filed Oct. 21, 1998 now U.S. Pat. No. 6,261,479.

BACKGROUND OF THE INVENTION

1. Field of the Invention

This invention relates to a transparent electro-conductive structure having a transparent substrate and formed successively thereon a transparent electro-conductive layer and a transparent coat layer, which is used in, e.g., front panels of display devices such as CRTs. More particularly, this invention relates to a transparent electro-conductive structure having superior weatherability, conductivity and so forth and also achievable of cost reduction in manufacture, and a process for its production, and also relates to a transparent electro-conductive layer forming coating fluid used for its production, and a process for preparing such a coating fluid.

2. Description of the Related Art

With office automation made in recent years, a variety of office information instruments have been introduced into offices, and as office environment it is no longer uncommon to do office works all day while facing display devices of office information instruments.

Now, in office works done sitting close to cathode ray tubes (CRTs) of computers as an example of the office information instruments, it is required for display screens to be easy to watch and not to cause visual fatigue, as well as to be free from attraction of dust and electric shock which are due to the electrostatic charging on CRT surfaces. Moreover, in addition to these, any ill influence on human bodies by low-frequency electromagnetic waves generated from CRTs is recently worried about, and it is desired for such electromagnetic waves not to leak outside.

The electromagnetic waves are generated from deflecting coils and flyback transformers and a large quantity of electromagnetic waves increasingly tend to leak to surroundings as televisions become larger in size.

Now, the leakage of magnetic fields can be prevented in its greater part by designing, e.g., by the changing of deflecting coils in shape. As for the leakage of electric fields, it can be prevented by forming a transparent electro-conductive layer on the front-glass surface of a CRT.

Measures to prevent such leakage of electric fields are theoretically the same as the countermeasures taken in recent years to prevent electrostatic charging. However, the transparent electro-conductive layer is required to have a much higher conductivity than any conductive layers formed for preventing the electrostatic charging. More specifically, a layer with a surface resistance of about $10^8$ ohm per square is considered sufficient for the purpose of preventing electrostatic charging. However, in order to prevent the leakage of electric fields (i.e., electric-field shielding), it is necessary to form at least a transparent electro-conductive layer with a low resistance of $10^6$ ohm per square or below, and preferably $10^3$ ohm per square or below.

Under such circumstances, as countermeasures for such a necessity, some proposals are made until now. In particular, as a method that can attain a low surface resistance at a low cost, a method is known in which a transparent electro-conductive layer forming coating fluid prepared by dispersing conductive fine particles in a solvent together with an inorganic binder such as an alkyl-silicate is coated on a front glass for a CRT, followed by drying and then baking at a temperature of 200° C. or below.

This method making use of such a transparent electro-conductive layer forming coating fluid is much simpler than any other transparent electro-conductive layer forming methods employing vacuum evaporation (vacuum deposition), sputtering or the like, and can enjoy a low production cost. Thus, it is a method very advantageous as electric-field shielding that can be applied to CRTS.

As the transparent electro-conductive layer forming coating fluid used in this method, a coating fluid is known in which indium tin oxide (ITO) is used as the conductive fine particles. Since, however, the resultant film has a surface resistance of as high as $10^4$ to $10^6$ ohm per square, a corrective circuit for cancelling electric fields is required in order to sufficiently shield the leaking electric fields. Hence, there has been a problem of a production cost which is rather high correspondingly. Meanwhile, in the case of a transparent electro-conductive layer forming coating fluid making use of a metal powder as the conductive fine particles, the resultant film may have a little lower transmittance than in the case of the coating fluid making use of ITO, but a low-resistance film of from $10^2$ to $10^3$ ohm per square can be formed. Accordingly, such a coating fluid, which makes the corrective circuit unnecessary, is advantageous in cost and is considered to become prevailing in future.

Fine metal particles used in the above transparent electro-conductive layer forming coating fluid are, as disclosed in Japanese Patent Applications Laid-open No. 8-77832 and No. 9-55175, limited to noble metals such as silver, gold, platinum, rhodium and palladium, which may hardly be oxidized in air. This is because, if fine particles of a metal other than noble metals as exemplified by iron, nickel or cobalt are used, oxide films are necessarily formed on the surfaces of such fine metal particles in the atmosphere, making it impossible to attain a good conductivity as the transparent electro-conductive layer.

From another aspect, in order to make display screens easy to watch, anti-glare treatment is made to the surfaces of face panels so that the screens can be restrained from reflecting light. This anti-glare treatment can be made by a method in which a finely rough surface is provided to make diffused reflection on the surface greater. This method, however, can not be said to be preferable very much because its employment may bring about a low resolution, resulting in a low picture quality. Accordingly, it is preferable to make the anti-glare treatment by an interference method in which the refractive index and layer thickness of a transparent film is so controlled that the reflected light may rather interfere destructively with the incident light. In order to attain the effect of low reflection by such an interference method, it is common to employ a film of double-layer structure formed of a high-refractive-index film and a low-refractive-index film each having an optical layer thickness set at 1/4 $\lambda$ and 1/4 $\lambda$, or 1/2 $\lambda$ and 1/4 $\lambda$, respectively ($\lambda$: wavelength). The film formed of fine particles of indium tin oxide (ITO) as mentioned above is also used as a high-refractive-index film of this type.

In metals, among parameters constituting an optical constants n−ik (n: refractive index; $i^2$−1; k: extinction coefficient), the value of n is small but the value of k is extremely greater than that in ITO, and hence, also when the transparent electro-conductive layer formed of fine metal particles is used, the effect of low reflection that is attributable to the interference of light can be attained by the double-layer structure as in the case of ITO (a high-tefractive-index film).

Now, as stated above, fine metal particles used in the conventional transparent electro-conductive layer forming coating fluid are limited to noble metals such as silver, gold, platinum, rhodium and palladium. To compare electrical resistance of these, platinum, rhodium and palladium have a resistivity of 10.6, 5.1 and 10.8 $\mu\Omega$·cm, respectively, which are higher than 1.62 and 2.2 $\mu\Omega$·cm of silver and gold, respectively. Hence, it has been advantageous to use fine silver particles or fine gold particles in order to form a transparent electro-conductive layer having a low surface resistance.

The use of fine silver particles, however, may cause a great deterioration due to sulfidation or contact with brine to cause a problem on weatherability. On the other hand, the use of fine gold particles can eliminate the problem on weatherability but has had a problem on cost as in the case when fine platinum particles, fine rhodium particles or fine palladium particles are used. Moreover, the use of fine gold particles also has a problem that, because the transparent electro-conductive layer formed absorbs a part of visible light rays in itself because of the optical properties inherent in gold, the film can not be used in the display surfaces of display devices such as CRTs where flat transmitted-light profiles are required over the whole region of visible light rays.

SUMMARY OF THE INVENTION

The present invention was made taking note of such problems. Accordingly, an object of the present invention is to provide a transparent electro-conductive structure having superior weatherability, conductivity and so forth and also achievable of cost reduction in manufacture.

Another object of the present invention is to provide a process for producing a transparent electro-conductive structure having superior weatherability, conductivity and so forth.

Still another object of the present invention is to provide a transparent electro-conductive layer forming coating fluid used in the production of a transparent electro-conductive structure having superior weatherability, conductivity and so forth.

A further object of the present invention is to provide a process for preparing the transparent electro-conductive layer forming coating fluid.

More specifically, in the present invention, the transparent electro-conductive structure comprises a transparent substrate and formed successively thereon a transparent electro-conductive layer and a transparent coat layer, wherein;

the transparent electro-conductive layer is composed chiefly of i) noble-metal-coated fine silver particles having an average particle diameter of from 1 nm to 100 nm, the fine silver particles being surface-coated with gold or platinum alone or a composite of gold and platinum, and ii) a binder matrix.

The process for producing this transparent electro-conductive structure comprises;

coating on a transparent substrate a transparent electro-conductive layer forming coating fluid comprising a solvent and noble-metal-coated fine silver particles dispersed in the solvent and having an average particle diameter of from 1 nm to 100 nm, the fine silver particles being surface-coated with gold or platinum alone or a composite of gold and platinum; and coating a transparent coat layer forming coating fluid on the transparent electro-conductive layer thus formed, followed by heating.

The transparent electro-conductive layer forming coating fluid used in the production of the transparent electro-conductive structure comprises a solvent and noble-metal-coated fine silver particles dispersed in the solvent and having an average particle diameter of from 1 nm to 100 nm, the fine silver particles being surface-coated with gold or platinum alone or a composite of gold and platinum.

The process for preparing the transparent electro-conductive layer forming coating fluid comprises;

a noble-metal-coated fine silver particle making step of adding to a colloidal dispersion of fine silver particles i) a reducing agent and at least one of an alkali metal aurate solution and an alkali metal platinate solution or ii) a reducing agent and a solution of mixture of an alkali metal aurate and an alkali metal platinate, to coat gold or platinum alone or a composite of gold and platinum on the surfaces of the fine silver particles to obtain a colloidal dispersion of noble-metal-coated fine silver particles;

a desalting and concentrating step-of subjecting the colloidal dispersion of noble-metal-coated fine silver particles to desalting treatment to lower its electrolyte concentration and to concentrating treatment to concentrate the colloidal dispersion, to obtain a concentrated dispersion of noble-metal-coated fine silver particles; and a solvent mixing step of adding to the concentrated dispersion of noble-metal-coated fine silver particles a solvent alone or a solvent containing at least one of conductive fine oxide particles and an inorganic binder, to obtain the transparent electro-conductive layer forming coating fluid.

Another process for preparing the transparent electro-conductive layer forming coating fluid comprises;

a noble-metal-coated fine silver particle making step of adding to a colloidal dispersion of fine silver particles i) at least one of an alkali metal aurate solution and an alkali metal platinate solution or ii) a solution of mixture of an alkali metal aurate and an alkali metal platinate, to coat gold or platinum alone or a composite of gold and platinum on the surfaces of the fine silver particles by the aid of displacement reaction caused by a difference in ionization tendency between silver, gold and platinum, to obtain a colloidal dispersion of noble-metal-coated fine silver particles;

a desalting and concentrating step of subjecting the colloidal dispersion of noble-metal-coated fine silver particles to desalting treatment to lower its electrolyte concentration and to concentrating treatment to concentrate the colloidal dispersion, to obtain a concentrated dispersion of noble-metal-coated fine silver particles; and a solvent mixing step of adding to the concentrated dispersion of noble-metal-coated fine silver particles a solvent alone or a solvent containing at least one of conductive fine oxide particles and an inorganic binder, to obtain the transparent electro-conductive layer forming coating fluid.

DESCRIPTION OF THE PREFERRED EMBODIMENTS

Figure 1:
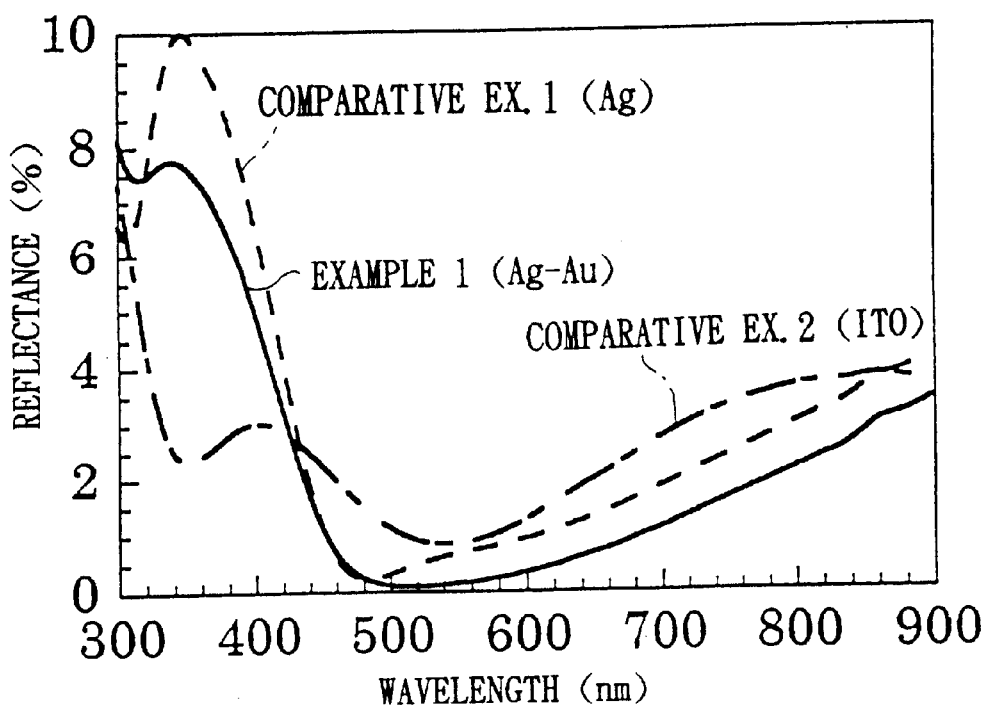
FIG. 1 is a graphical representation showing reflection profiles of transparent electro-conductive structures according to Example 1 and Comparative Examples 1 and 2.

The present invention will be described below in detail.

First the present invention is based on the standpoint that gold or platinum is chemically stable and has excellent weatherability, chemical resistance, oxidation resistance and so forth and hence fine silver particles can be improved in chemical stability by coating gold or platinum alone or a composite of gold and platinum on their surfaces. As previously stated, platinum has a little higher electrical resistance than silver and gold. However, the gold or platinum alone or the composite of gold and platinum is used as coat layers on the surfaces of fine silver particles and hence it by no means damages the good conductivity of the silver. Incidentally, in place of the coating of the fine silver particles with the gold or platinum alone or composite of gold and platinum, one may contemplate making silver into an alloy with gold or platinum or with gold and platinum to form fine alloy particles. Such a method, however, makes it necessary to use the gold or platinum alone or the gold and platinum in a high concentration in the whole fine particles, and hence requires the gold or platinum or the gold and platinum in a large quantity, leaving a difficulty in view of cost. From the foregoing standpoint, in the present invention, noble-metal-coated fine silver particles obtained by coating the gold or platinum alone or composite of gold and platinum on the surfaces of fine silver particles are used so that the above problems can be solved.

More specifically, the present invention is a transparent electro-conductive structure having a transparent substrate and formed successively thereon a transparent electro-conductive layer and a transparent coat layer, characterized in that the transparent electro-conductive layer is composed chiefly of i) noble-metal-coated fine silver particles having an average particle diameter of from 1 nm to 100 nm, the fine silver particles being surface-coated with gold or platinum alone or a composite of gold and platinum, and ii) a binder matrix.

The coating of the gold or platinum alone or composite of gold and platinum on the surfaces of fine silver particles constituting the transparent electro-conductive layer brings about a great improvement in weatherability, chemical resistance and so forth because the silver in the interiors of the noble-metal-coated fine silver particles is protected by the gold or platinum alone or composite of gold and platinum.

For example, when a transparent electro-conductive layer comprised of fine silver particles and a binder matrix composed chiefly of silicon oxide is immersed in 5% brine, chlorine ions in the brine react with the fine silver particles of the transparent electro-conductive layer to cause a great deterioration in a short time of 1 hour or less and cause even film peeling in the transparent electro-conductive layer. However, in the case of the transparent electro-conductive layer in which the noble-metal-coated fine silver particles coated with the gold or platinum alone or a composite of gold and platinum are used, the transparent electro-conductive layer causes no change at all even when immersed for 24 hours or longer, depending on the coating weight of the gold or platinum alone or composite of gold and platinum, and shows a superior weatherability. Also, gold and platinum do not oxidize in the atmosphere, and hence do not cause any deterioration of electrical resistance due to oxidation. Thus, the transparent electro-conductive layer in which the noble-metal-coated fine silver particles are used has a better surface resistance than the transparent electro-conductive layer in which conventional fine silver particles are used Here, the noble-metal-coated fine silver particles are required to have an average particle diameter of from 1 nm to 100 nm. Noble-metal-coated fine silver particles having an average particle diameter smaller than 1 nm can be produced with difficulty, and also tend to aggregate, thus such particles are not practical. As for those larger than 100 nm, the transparent electro-conductive layer may have too low a transmittance of visible light rays, and, even if formed in a small layer thickness to ensure a high transmittance of visible light rays, the layer may have too high a surface resistance, thus such particles are not practical. Incidentally, the average particle diameter herein used refers to average particle diameter of fine particles observed on a transmission electron microscope (TEM).

In the noble-metal-coated fine silver particles, the gold or platinum alone or composite of gold and platinum may be in a coating weight set within the range of from 5 to 100 parts by weight, and preferably from 10 to 50 parts by weight, based on 100 parts by weight of silver. If the gold or platinum alone or composite of gold and platinum is in a coating weight less than 5 parts by weight, the protection attributable to coating may be less effective to make the weatherability a little poor. If on the other hand it is in a coating weight more than 100 parts by weight, a difficulty may occur in view of cost.

For the purpose of improving film transmittance in the transparent electro-conductive layer, conductive fine oxide particles of at least one selected from tin oxide, antimony tin oxide and indium tin oxide may also be added to the interior of the transparent electro-conductive layer. In this instance, the noble-metal-coated fine silver particles and conductive fine oxide particles in the transparent electro-conductive layer may be in a mixing ratio so set that the conductive fine oxide particles are in an amount within the range of from 1 to 200 parts by weight, and preferably from 10 to 100 parts by weight, based on 100 parts by weight of the noble-metal-coated fine silver particles. If the conductive fine oxide particles are mixed in an amount less than 1 part by weight, the addition of the conductive fine oxide particles can not be effective, and if on the other hand in an amount more than 200 parts by weight, the transparent electro-conductive layer may have too high a resistance to be practical. As in the case of the noble-metal-coated fine silver particles, the conductive fine oxide particles may preferably have an average particle diameter of from about 1 nm to about 100 nm.

The transparent electro-conductive layer forming coating fluid used to form the transparent electro-conductive layer can be prepared by a process as described below.

First, a colloidal dispersion of fine silver particles is made up by a known process [e.g., the Carey-Lea process, Am. J. Sci., 37, 47 (1889), Am. J. Sci., 38 (1889)]. More specifically, a mixed solution of an aqueous iron (II) sulfate solution and an aqueous sodium citrate solution are added to an aqueous silver nitrate solution to carry out reaction, and the resultant sediment is filtered and washed, followed by addition of pure water, whereby a colloidal dispersion of fine silver particles (Ag: 0.1 to 10% by weight) can be made up simply. This colloidal dispersion of fine silver particles may be made up by any method so long as fine silver particles having an average particle diameter of from 1 nm to 100 nm can be dispersed, without any limitation to the above method. To the colloidal dispersion of fine silver particles thus obtained, a reducing agent is added and an alkali metal aurate solution or an alkali metal platinate solution is further added thereto, or an alkali metal aurate solution and an alkali metal platinate solution are added separately, or a solution of mixture of an alkali metal aurate and an alkali metal platinate is added, to thereby coat gold or platinum alone or a composite of gold and platinum on the surfaces of the fine silver particles. Thus, a colloidal dispersion of noble-metal-coated fine silver particles can be obtained.

In this step of making noble-metal-coated fine silver particles, a dispersant may optionally be added in a small quantity to any one of, or all of, the colloidal dispersion of fine silver particles, the alkali metal aurate solution, the alkali metal platinate solution and the solution of mixture of an alkali metal aurate and an alkali metal platinate.

Here, in the above step of making noble-metal-coated fine silver particles, the reaction to coat the gold or platinum alone or composite of gold and platinum on the surfaces of fine silver particles takes place because minute and fine silver particles are already present in a large quantity in the solution at the time when gold or platinum is produced as a result of the reduction of an aurate or a platinate, and because the coating proceeds under conditions more advantageous in view of energy when gold or platinum grows on the surfaces of fine silver particles serving as nuclei than when gold or platinum makes nucleation (homogeneous nucleation) by itself. Thus, the presence of minute and fine silver particles in a large quantity in the solution is prerequisite at the time when gold or platinum is produced as a result of the reduction of an aurate or a platinate, and hence the timing at which the aurate solution or platinate solution, the aurate solution and platinate solution or the solution of mixture of the aurate and platinate and the reducing agent are added in the colloidal dispersion of fine silver particles in the step of making noble-metal-coated fine silver particles may preferably be so controlled that the reducing agent is added at least prior to adding the aurate solution or platinate solution, the aurate solution and platinate solution or the solution of mixture of an alkali metal aurate and an alkali metal platinate. More specifically, this is because, in the case when the reducing agent and the aurate solution or platinate solution, or the reducing agent and the aurate solution and platinate solution, or the reducing agent and the solution of mixture of the aurate and platinate are added in the colloidal dispersion of fine silver particles in the state they are mixed, the gold or platinum may be produced as a result of the reduction of the aurate or platinate and also the gold or platinum may make nucleation (homogeneous nucleation) by itself, at the stage where the aurate solution or platinate solution, the aurate solution and platinate solution or the solution of mixture of the aurate and platinate is mixed in the reducing agent, so that the reaction to coat the gold or platinum alone or composite of gold and platinum on the surfaces of fine silver particles may not take place even when the aurate solution and/or platinate solution or the like and the reducing agent are added to the colloidal dispersion of fine silver particles after they are mixed.

As the reducing agent, hydrazine $N_2H_4$, borohydrates such as sodium borohydrate $NaBH_4$, and formaldehyde may be used, but without limitation to these. Any reducing agents may be used so long as they do not cause aggregation of ultrafine silver particles when added in the colloidal dispersion of fine silver-particles and can reduce the aurate and platinate to gold and platinum, respectively.

For example, the reduction reaction taking place when potassium aurate $KAu(OH)_4$ and potassium platinate $K_2Pt(OH)_6$ are each reduced with hydrazine or sodium borohydrate is represented by the following scheme.

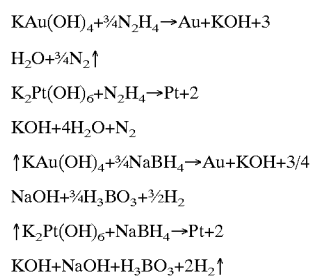

Here, when sodium borohydrate is used as the reducing agent, the electrolyte produced by reduction reaction is in a high concentration as can be confirmed by the above reaction scheme, and hence the fine particles tend to aggregate as will be described later. Thus, there is a limit on its quantity when added as the reducing agent, and there is a disadvantage that a high silver concentration can not be achieved in the colloidal dispersion of fine silver particles used.

On the other hand, when hydrazine is used as the reducing agent, the electrolyte is less produced as can be confirmed by the above reaction scheme, thus the hydrazine is more suited as the reducing agent.

Incidentally, if any salts other than the alkali metal aurate and alkali metal platinate as exemplified by chloroauric acid $HAuCl_4$ and chloroplatinic acid $H_2PtCl_6$, or chloroaurates such as $NaAuCl_4$ and $KAuCl_4$ and chloroplatinates such as $Na_2PtCl_6$ and $K_2PtCl_6$ are used as materials for coating gold and platinum, the reduction reaction caused by hydrazine is represented by the following scheme.

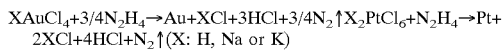

$XAuCl_4+3/4N_2H_4 \rightarrow Au+XCl+3HCl+3/4N_2\uparrow X_2PtCl_6+N_2H_4 \rightarrow Pt+2XCl+4HCl+N_2\uparrow (X: H, Na\ or\ K)$ When chloroauric acid and the like are used in this way, not only the electrolyte produced by reduction reaction is in a high concentration, but also chlorine ions are produced, and hence react with fine silver particles to form silver chloride, which is slightly soluble. Thus, it is difficult to use these as materials for forming the transparent electro-conductive layer according to the present invention.

In the above process, it is also possible not to use hydrazine and to coat the gold or platinum alone or composite of gold and platinum by the aid of displacement reaction caused by a difference in ionization tendency between silver, gold and platinum.

More specifically, the alkali metal aurate solution or alkali metal platinate solution or the alkali metal aurate solution and alkali metal platinate solution or the solution of mixture of an alkali metal aurate and an alkali metal platinate may be added directly to the colloidal dispersion of fine silver particles, whereby the colloidal dispersion of noble-metal-coated fine silver particles can be obtained.

Incidentally, the reaction to coat gold or platinum is represented by the following scheme.

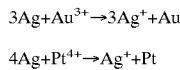

$3Ag+Au^{3+} \rightarrow 3Ag^{+}+Au$ $4Ag+Pt^{4+} \rightarrow Ag^{+}+Pt$

The colloidal dispersion of noble-metal-coated fine silver particles thus obtained may thereafter preferably be subjected to desalting by dialysis, electrodialysis, ion exchange, ultrafiltration or the like to lower the concentration of the electrolyte in the dispersion. This is because colloids may commonly aggregate when electrolytes are in a high concentration. This phenomenon is known also as the Schultz-Hardy's rule. For the same reasons, in the case when the conductive fine oxide particles of one selected from tin oxide, antimony tin oxide and indium tin oxide are mixed in the colloidal dispersion of noble-metal-coated fine silver particles or the transparent electro-conductive layer forming coating fluid, such conductive fine oxide particles or a dispersion thereof may also preferably be desalted beforehand thoroughly.

Next, the colloidal dispersion of noble-metal-coated fine silver particles which has been subjected to desalting treatment is concentrated to obtain a concentrated dispersion of noble-metal-coated fine silver particles. Then, to this concentrated dispersion of noble-metal-coated fine silver particles, an organic solvent alone or an organic solvent containing at least one of conductive fine oxide particles and an inorganic binder is added to make component adjustment (e.g., fine-particle concentration, water concentration). Thus, the transparent electro-conductive layer forming coating fluid is obtained.

When ultrafiltration is employed as a desalting method, this ultrafiltration also acts as concentrating treatment as will be described later, and hence it is also possible to carry out the desalting treatment and the concentrating treatment simultaneously. Accordingly, with regard to the desalting treatment and concentrating treatment of the colloidal dispersion in which the noble-metal-coated fine silver particles stand dispersed, their order may be set as desired depending on the manner of treatment to be employed. The desalting treatment and concentrating treatment may be made simultaneously when ultrafiltration or the like is employed.

In the present invention, the fact that the gold or platinum alone or composite of gold and platinum is coated on the surfaces of fine silver particles is founded by technical confirmation made by observation of particles on a transmission electron microscope (TEM) and analysis of components (EDX: energy dispersive X-ray analyzer), being made on that any changes in particle diameter are little seen before and after the coating of the gold or platinum alone or composite of gold and platinum and that the gold or platinum alone or composite of gold and platinum is distributed uniformly on each particle, and also coordination number (the number of coordination) of the gold or platinum alone or composite of gold and platinum, examined by EXAFS (extended X-ray absorption fine structure) analysis.

With regard to the form in which the composite of gold and platinum covers the fine silver particles, various forms are possible depending on differences coming from whether the aurate solution and the platinate solution are used or the solution of mixture of the aurate and platinate in the step of coating the composite of gold and platinum (i.e., the noble-metal-coated fine silver particle making step) or depending on differences in the timing of mixing these solutions and in the concentration of the aurate and platinate. More specifically, depending on the differences in these conditions, various forms are possible such that the gold covers the fine silver particles on their whole surfaces or in part and the platinum further covers them on the whole surfaces, or conversely the platinum covers the fine silver particles on the whole surfaces or in part and the gold further covers them on the whole surfaces, or the platinum and gold standing each alone without overlapping each other, or in the form of an alloy, cover the fine silver particles on their whole surfaces.

The treatment to concentrate the colloidal dispersion of noble-metal-coated fine silver particles can be made by any of conventional methods such as reduced pressure evaporation and ultrafiltration. Also, the transparent electro-conductive layer forming coating fluid may preferably have a water concentration of from 1 to 20% by weight. If it has a water concentration more than 20% by weight, in some cases the transparent electro-conductive layer forming coating fluid tends to cause cissing due to a high surface tension of water in the course of drying after it has been coated on the transparent substrate.

The problem of cissing can be solved by adding a surface-active agent in the transparent electro-conductive layer forming coating fluid. However, there may arise another problem that the mixing of the surface-active agent tends to cause faulty coating. Thus, it is preferable for the transparent electro-conductive layer forming coating fluid to have a water concentration of from 1 to 20% by weight.

There are no particular limitations on the above organic solvent, which may appropriately selected depending on coating methods and film-forming conditions. It may include, but not limited to, e.g., alcohol type solvents such as methanol, ethanol, isopropanol, butanol, benzyl alcohol and diacetone alcohol, ketone type solvents such as acetone, methyl ethyl ketone (MEK), methyl isobutyl ketone (MIBK), cyclohexanone and isophorone, glycol derivatives such as propylene glycol methyl ether and propylene glycol ethyl ether, dimethylformamide (DMF), and N-methyl-2-pyrrolidone (NMP).

Using the transparent electro-conductive layer forming coating fluid thus obtained, the transparent electro-conductive structure can be obtained which has the transparent substrate and formed thereon the transparent electro-conductive layer composed chiefly of i) noble-metal-coated fine silver particles having an average particle diameter of from 1 nm to 100 nm and ii) a binder matrix and a transparent coat layer further formed thereon.

A transparent double-layer film constituted of the transparent electro-conductive layer and the transparent coat layer can be formed on the transparent substrate by a method described below. That is, the transparent electro-conductive layer forming coating fluid composed chiefly of the solvent and the noble-metal-coated fine silver particles having an average particle diameter of from 1 nm to 100 nm is coated on the transparent substrate, such as a glass substrate or a plastic substrate, by a coating process such as spray coating, spin coating, wire bar coating or doctor blade coating, optionally followed by drying. Thereafter, a transparent coat layer forming coating fluid composed chiefly of, e,g, silica sol is over-coated (top-coated) by the same coating process as the above.

Next, after the overcoating, the coating formed is heated at a temperature of about, e.g., 50 to 250° C. to cause the over-coated transparent coat layer to harden, thus the transparent double-layer films are formed. Incidentally, the heating at a temperature of about 50 to 250° C. may cause no problem because the noble-metal-coated fine silver particles are protected by the gold or platinum alone or composite of gold and platinum. If, however, conventional fine silver particles are used, the surface resistance may increase at a temperature higher than 200° C. as a result of oxidative diffusion to cause deterioration of films.

Here, when the transparent coat layer forming coating fluid composed chiefly of silica sol or the like is over-coated by the above coating process, the silica sol thus over-coated (this silica sol turns into a binder matrix composed chiefly of silicon oxide as a result of the heating) soaks into gaps between noble-metal-coated fine silver particles present in the layer formed by the transparent electro-conductive layer forming coating fluid previously coated, composed chiefly of the solvent and the noble-metal-coated fine silver particles. Thus, an improvement in conductivity, an improvement in strength and a more improvement in weatherability can be achieved simultaneously.

Figure 2:
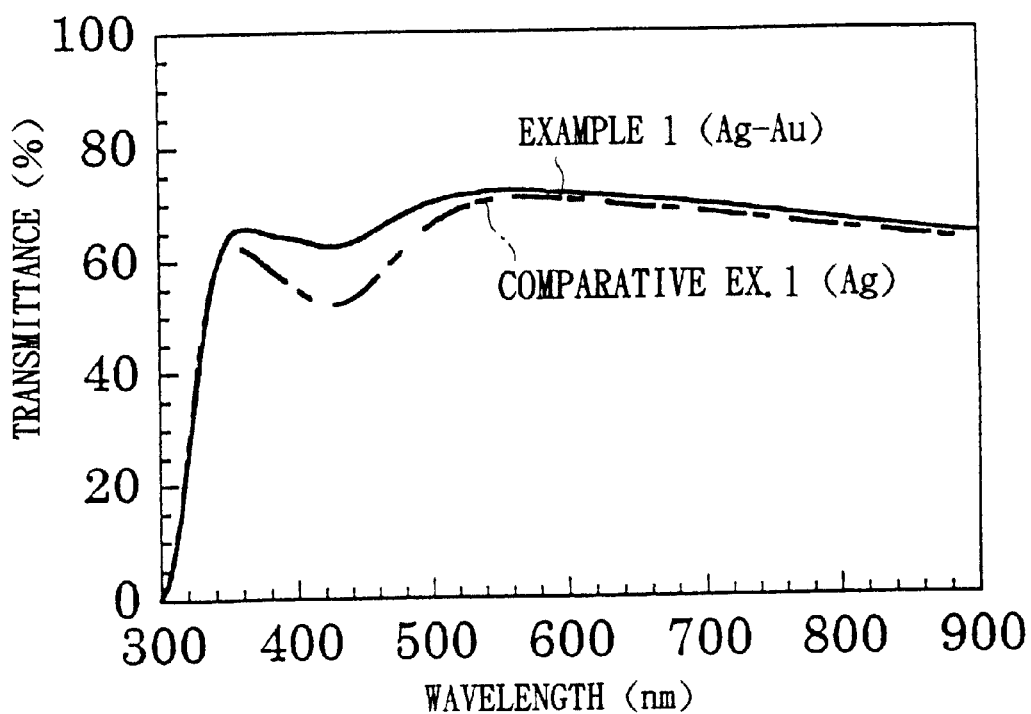
FIG. 2 is a graphical representation showing transmission profiles of transparent electro-conductive structures according to Example 1 and Comparative Example 1.

Moreover, the transparent double-layer film structure constituted of the transparent electro-conductive layer and the transparent coat layer can make the reflectance of the transparent double-layer film greatly low, because the transparent electro-conductive layer comprising the noble-metal-coated fine silver particles dispersed in the binder matrix composed chiefly of silicon oxide has, in its optical constant (n–ik), a refractive index n which is not so great but has a great extinction coefficient. Then, as shown in FIG. 1, in comparison with instances where fine ITO particles (Comparative Example 2) or fine silver particles (Comparative Example 1) are used, the reflectance is improved at a short wavelength region (380 to 500 nm) of visible light rays when noble-metal-coated fine silver particles coated with gold alone (Example 1) is used. Also, the profile of transmitted light of the transparent double-layer film is, as shown in FIG. 2, also improved at the short wavelength region of visible light rays by coating gold alone on the fine silver particles. For example, in comparison of standard deviation in respect of the transmittance of only a transparent double-layer film, excluding the transparent substrate, at each wavelength plotted at intervals of 5 nm of a wavelength region (380 to 780 nm) of visible light rays, the standard deviation is about 7% when fine silver particles (Comparative Example 1) are used, whereas it is a small value of about 2 to 3% when the noble metal is coated (Examples 1 to 11) on the fine silver particles, where very flat transmission profiles are obtained. The reason why the reflection and transmission characteristics of these transparent double-layer films are improved is still unclear, and is presumed to be a change in surface plasmon of fine metal particles that is attributable to the coating of the gold or platinum alone or composite of gold and platinum on the fine silver particles.

Here, as the silica sol, usable are a polymeric product obtained by adding water and an acid catalyst to an orthoalkyl-silicate to effect hydrolysis followed by dehydration condensation polymerization further made to proceed, or a polymeric product obtained by subjecting a commercially available alkyl-silicate solution having already been subjected to hydrolysis and condensation polymerization made to proceed up to a 4- to 5-mer (tetramer to pentamer), to hydrolysis and dehydration condensation polymerization further made to proceed. Since the solution viscosity increases with progress of dehydration condensation polymerization to finally make the product solidify, the degree of dehydration condensation polymerization may be so controlled as to be not higher than the maximum viscosity at which the coating fluid can be coated on the transparent substrate such as a glass substrate or a plastic substrate. The degree of dehydration condensation polymerization is not particularly specified so long as it is kept at a level not higher than the maximum viscosity, but may preferably be from about 500 to about 3,000 as weight-average molecular weight, taking account of film strength and weatherability. Then, the dehydration condensation polymerization is substantially completed at the time the transparent double-layer film is heated and baked, and the alkyl-silicate partially hydrolyzed polymeric product turns into a hard silicate film (a film composed chiefly of silicon oxide). To the silica sol, fine magnesium fluoride particles, an alumina sol, a titania sol or a zirconia sol may be added so that the refractive index of the transparent coat layer can be controlled to change the reflectance of the transparent double-layer film.

In addition to the solvent and the noble-metal-coated fine silver particles having an average particle diameter of from 1 nm to 100 nm, dispersed in the solvent, a silica sol as an inorganic binder component electro-constituting the binder matrix of the transparent electro-conductive layer may also be mixed to make up the transparent electro-conductive layer forming coating fluid. In such an instance, too, the transparent electro-conductive layer forming coating fluid containing the silica sol may be coated, optionally followed by drying, and thereafter the transparent coat layer forming coating fluid may be over-coated by the above coating process, thus a similar transparent double-layer film comprised of the transparent electro-conductive layer and the transparent coat layer can be obtained. For the same reasons as in the case of mixing the conductive fine oxide particles in the transparent electro-conductive layer forming coating fluid, the silica sol to be mixed in the transparent electro-conductive layer forming coating fluid may also preferably be desalted beforehand thoroughly.

As described above, according to the transparent electro-conductive structure of the present invention, the transparent electro-conductive layer of the transparent double-layer film constituted of the transparent electro-conductive layer and transparent coat layer formed successively on the transparent substrate is composed chiefly of i) the noble-metal-coated fine silver particles having an average particle diameter of from 1 nm to 100 nm, the fine silver particles being surface-coated with the gold or platinum alone or composite of gold and platinum, and ii) the binder matrix. Hence, compared with conventional transparent electro-conductive structures, it has superior reflection preventive effect and transmission profile and also has a good weatherability and a high electric-filed shielding effect.

Accordingly, the transparent electro-conductive structure can be used in front panels of display devices such as the CRTs previously stated, plasma display panels (PDPs), vacuum fluorescent display (VFD) devices, field emission display (FED) devices, electro-luminescence display (ELD) devices and liquid-crystal display (LCD) devices.

According to the transparent electro-conductive layer forming coating fluid of the present invention, the coating fluid is composed chiefly of the solvent and the noble-metal-coated fine silver particles dispersed in the solvent and having an average particle diameter of from 1 nm to 100 nm, the fine silver particles being surface-coated with the gold or platinum alone or composite of gold and platinum. Hence, it can effectively form a transparent double-layer film having a good reflection preventive function and a good electric-filed shielding function and also having a good transmission profile at the region of visible light rays and a good weatherability, compared with transparent electro-conductive layers formed using conventional transparent electro-conductive layer forming coating fluids.

Accordingly, the transparent electro-conductive structure usable in front panels of display devices such CRTs, PDPs and LCD devices can be obtained by forming the transparent electro-conductive layer by the use of this transparent electro-conductive layer forming coating fluid.

The present invention will be described below in greater detail by giving Examples. The present invention is by no means limited to these Examples. In the following, "%" refers to "% by weight" except for "%" of transmittance, reflectance and haze, and "part(s)" refers to "part(s) by weight".

EXAMPLE 1

A colloidal dispersion of fine silver particles was made up by the Carey-Lea process. Stated specifically, to 33 g of an aqueous 9% silver nitrate solution, a mixed solution of 39 g of an aqueous 23% iron (II) sulfate solution and 48 g of an aqueous 37.5% sodium citrate solution was added, and thereafter the sediment formed was filtered and washed, followed by addition of pure water to make up a colloidal dispersion of fine silver particles (Ag: 0.45%). To 15 g of this colloidal dispersion of fine silver particles, 0.5 g of an aqueous 1% hydrazine solution was added, and a mixed solution of 15 g of an aqueous potassium aurate KAu(OH4) solution (Au: 0.1%) and 0.3 g of an aqueous 2% polymeric dispersant solution was further added with stirring to obtain a colloidal dispersion of noble-metal-coated fine silver particles coated with gold alone. This colloidal dispersion of noble-metal-coated fine silver particles was desalted with an ion-exchange resin (available from Mitsubishi Chemical Industries Limited; trade name: DIAION SKLE, SA20AP), followed by ultrafiltration to obtain a concentrated dispersion. To this dispersion, ethanol (EA) and diacetone alcohol (DAA) were added to obtain a transparent electro-conductive layer forming coating fluid containing noble-metal-coated fine silver particles (Ag: 0.217%; Au: 0.057%; water: 11.8%; EA: 82.9%; DAA: 5.0%). The transparent electro-conductive layer forming coating fluid thus obtained was observed on a transmission electron microscope to reveal that the noble-metal-coated fine silver particles had an average particle diameter of 7.2 nm.

Next, the transparent electro-conductive layer forming coating fluid containing the noble-metal-coated fine silver particles was spin-coated (130 rpm, for 60 seconds) on a glass substrate (soda-lime glass of 3 mm thick) heated to 40° C., and thereafter subsequently a silica sol was spin-coated thereon (130 rpm, for 60 seconds), followed by hardening at 180° C. for 20 minutes to obtain a glass substrate provided with a transparent double-layer film constituted of a transparent electro-conductive layer containing the noble-metal-coated fine silver particles and a transparent coat layer formed of a silicate film composed chiefly of silicon oxide, i.e., a transparent electro-conductive structure according to Example 1.

Here, the above silica sol was made up using 19.6 parts of Methyl-silicate 51 (trade name; available from Colcoat Co., Ltd.), 57.8 parts of ethanol, 7.9 parts of an aqueous 1% nitric acid solution and 14.7 parts of pure water to obtain one having $SiO_2$ (silicon oxide) solid content in a concentration of 10%, which was finally diluted with a mixture of isopropyl alcohol (IPA) and n-butanol (NBA) (IPA/NBA=3/1) so as to have the $SiO_2$ solid content in a concentration of 0.7%.

Figure 3:
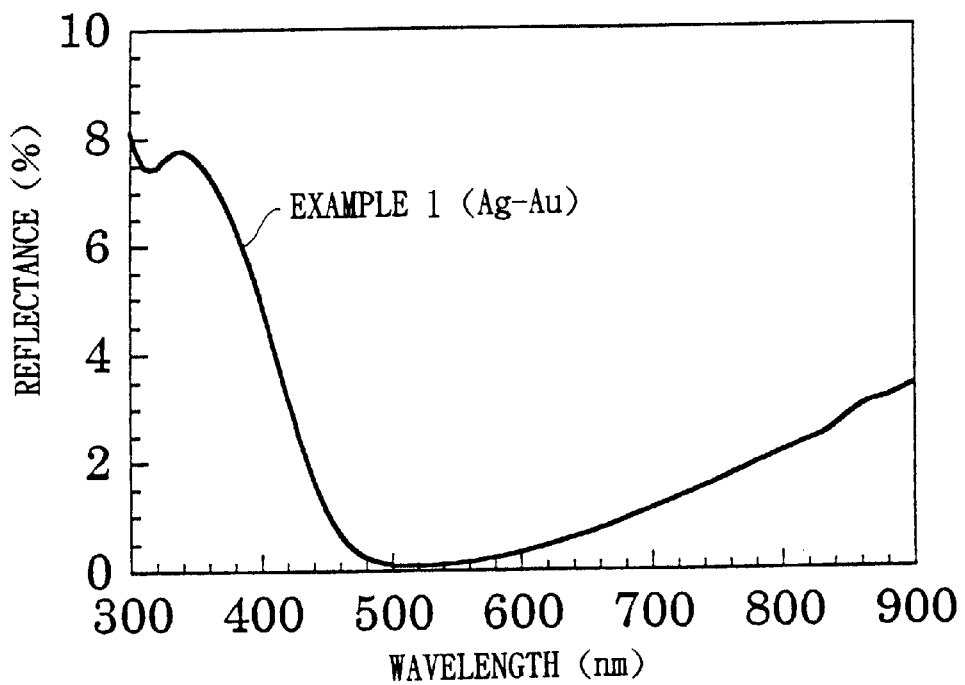
FIG. 3 is a graphical representation showing a reflection profile of a transparent electro-conductive structure according to Example 1.
Figure 4:
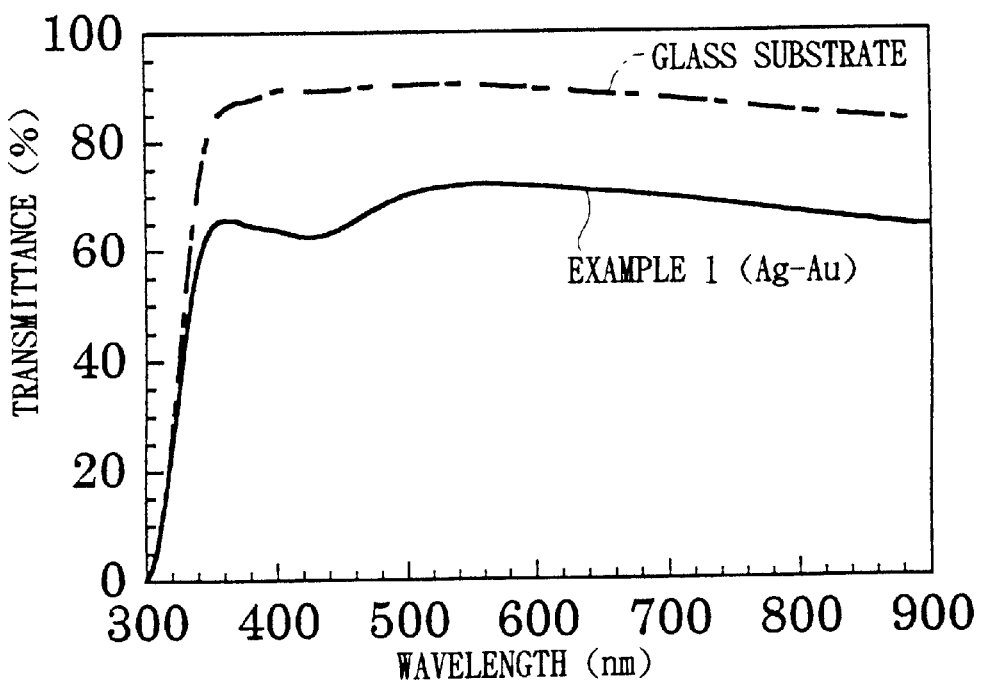
FIG. 4 is a graphical representation showing transmission profiles of the transparent electro-conductive structure according to Example 1 and a glass substrate which is a constituent member of this structure.

Film characteristics (surface resistance, visible light ray transmittance, standard deviation of transmittance, haze, and bottom reflectance/bottom wavelength) examined on the transparent double-layer film formed on the glass substrate are shown in Table 1 below. The bottom reflectance is meant to be a minimum reflectance in the reflection profile of the transparent electro-conductive structure, and the bottom wavelength a wavelength at the minimum reflectance. The reflection profile of the transparent electro-conductive structure according to Example 1 is shown in FIGS. 1 and 3, and its transmission profile in FIGS. 2 and 4 together.

Transmittance shown in Table 1 in respect of only the transparent double-layer film, excluding the transparent substrate (glass substrate), at each wavelength plotted at intervals of 5 nm of a wavelength region (380 to 780 nm) of visible light rays is determined in the following way:

Transmittance (%) of only transparent double-layer film, excluding transparent substrate (glass substrate)=[(transmittance measured on the whole structure inclusive of transparent substrate)/(transmittance of transparent substrate)]×100

Here, in the present specification, unless particularly noted, a value obtained by measuring transmittance of the whole structure inclusive of the transparent substrate (i.e., the transparent substrate having the transparent double-layer film, meant to be the transparent electro-conductive structure) is used as the transmittance.

The surface resistance of the transparent double-layer film is measured with a surface resistance meter LORESTA AP (MCP-T400), manufactured by Mitsubishi Chemical Industries Limited. The value of haze and the visible light ray transmittance is measured with a haze meter (ER-200, a reflectance-transmittance meter) manufactured by Murakami Color Research Laboratory, on the whole structure inclusive of the transparent substrate. The reflectance and the reflection and transmission profiles are measured with a spectrophotometer (U-400) manufactured by Hitachi Ltd. The particle diameter of the noble-metal-coated fine silver particles is measured by observing the particles on a transmission electron microscope manufactured by Nippon Denshi K.K.

EXAMPLE 2

Using a colloidal dispersion of fine silver particles which was made up in the same manner as in Example 1, the procedure of Example 1 was repeated except that an aqueous 1.5% hydrazine solution and an aqueous potassium aurate solution (Au: 0.15%) were used to obtain a transparent electro-conductive layer forming coating fluid in which noble-metal-coated fine silver particles having an average particle diameter of 6.3 nm were dispersed (Ag: 0.221%; Au: 0.079%; water: 5.0%; EA: 89.7%; DAA: 5.0%) and the silica sol was diluted so as to have the $SiO_2$ (silicon oxide) solid content in a concentration of 0.65%. Thus, a glass substrate provided with a transparent double-layer film constituted of a transparent electro-conductive layer containing the noble-metal-coated fine silver particles and a transparent coat layer formed of a silicate film composed chiefly of silicon oxide, i.e., a transparent electro-conductive structure according to Example 2 was obtained.

Figure 5:
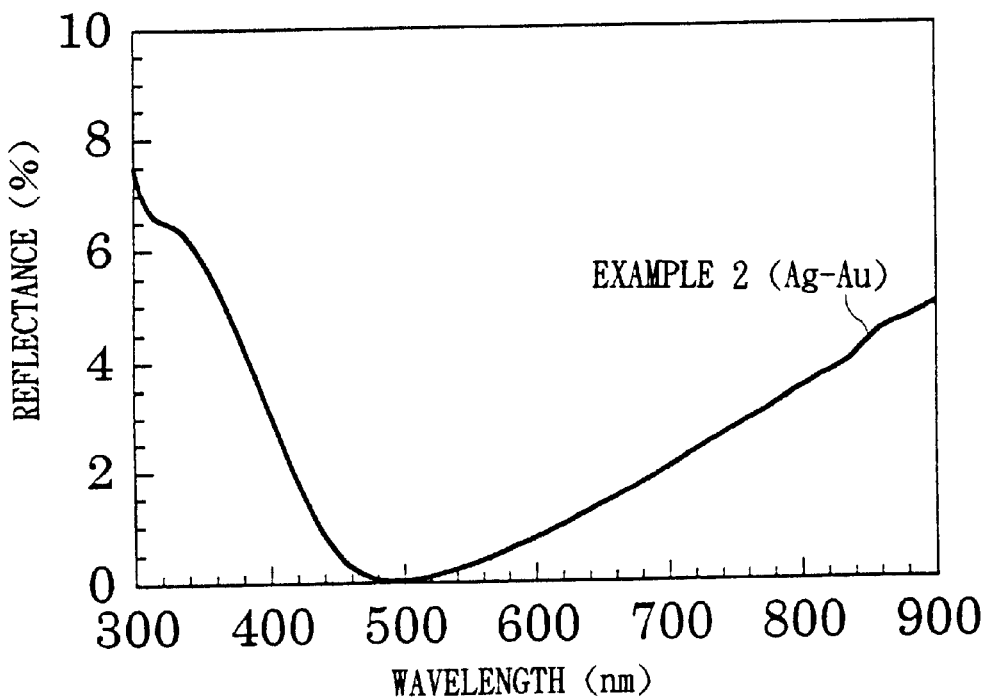
FIG. 5 is a graphical representation showing a reflection profile of a transparent electro-conductive structure according to Example 2.
Figure 6:
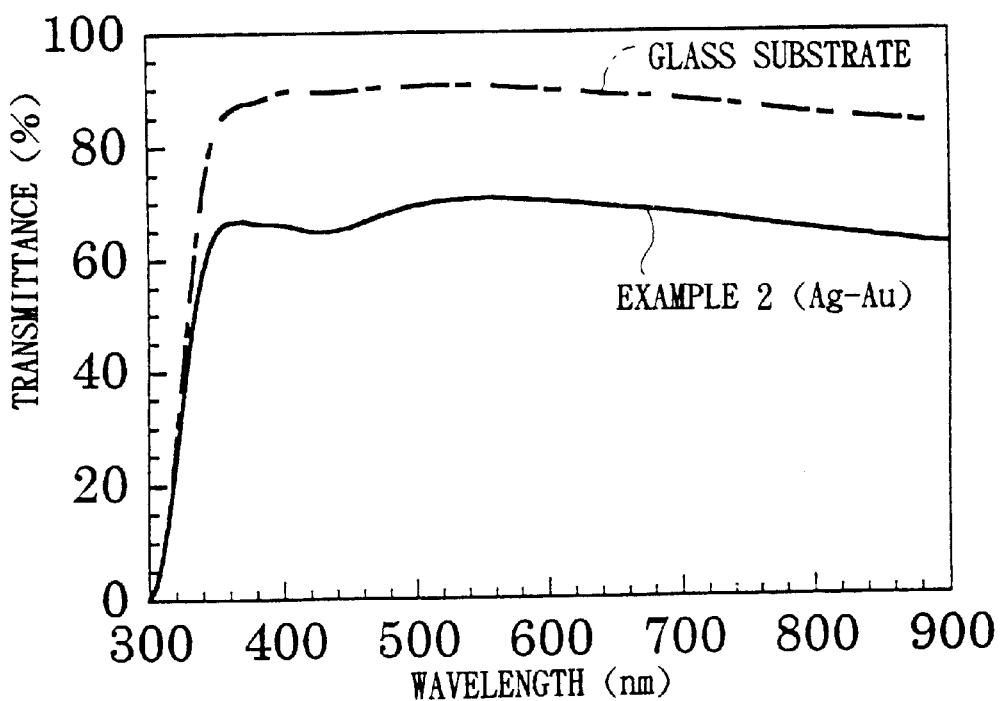
FIG. 6 is a graphical representation showing transmission profiles of the transparent electro-conductive structure according to Example 2 and a glass substrate which is a constituent member of this structure.

Film characteristics examined on the transparent double-layer film formed on the glass substrate are shown in Table 1 below. The reflection profile of the transparent electro-conductive structure according to Example 2 is shown in FIG. 5, and its transmission profile in FIG. 6.

EXAMPLE 3

Using a colloidal dispersion of fine silver particles which was made up in the same manner as in Example 1, the procedure of Example 1 was repeated except that an aqueous 0.5% hydrazine solution and an aqueous potassium aurate solution (Au: 0.05%) were used to obtain a transparent electro-conductive layer forming coating fluid in which noble-metal-coated fine silver particles having an average particle diameter of 6.8 nm were dispersed (Ag: 0.24%; Au: 0.028%; water: 3.7%; EA: 91.0%; DAA: 5.0%) and the silica sol was diluted so as to have the $SiO_2$ (silicon oxide) solid content in a concentration of 0.65%. Thus, a glass substrate provided with a transparent double-layer film constituted of a transparent electro-conductive layer containing the noble-metal-coated fine silver particles and a transparent coat layer formed of a silicate film composed chiefly of silicon oxide, i.e., a transparent electro-conductive structure according to Example 3 was obtained.

Film characteristics examined on the transparent double-layer film formed on the glass substrate are shown in Table 1 below.

EXAMPLE 4

Using a colloidal dispersion of fine silver particles which was made up in the same manner as in Example 1, the procedure of Example 1 was repeated except that, without addition of the reducing agent aqueous hydrazine solution, 15 g of an aqueous potassium aurate solution (Au: 0.05%) was added with stirring to effect displacement reaction between gold and silver to obtain a colloidal dispersion of noble-metal-coated fine silver particles and also obtain a transparent electro-conductive layer forming coating fluid in which noble-metal-coated fine silver particles having an average particle diameter of 6.5 nm were dispersed (Ag: 0.245%; Au: 0.025%; water: 7.6%; EA: 87.1%; DAA: 5.0%). Thus, a glass substrate provided with a transparent double-layer film constituted of a transparent electro-conductive layer containing the noble-metal-coated fine silver particles and a transparent coat layer formed of a silicate film composed chiefly of silicon oxide, i.e., a transparent electro-conductive structure according to Example 4 was obtained.

Film characteristics examined on the transparent double-layer film formed on the glass substrate are shown in Table 1 below.

EXAMPLE 5

Using a colloidal dispersion of fine silver particles which was made up in the same manner as in Example 1, and using 0.4 g of an aqueous 1% hydrazine solution and an aqueous potassium aurate solution (Au: 0.075%), a dispersion of noble-metal-coated fine silver particles having an average particle diameter of 7.1 nm was obtained.

Then, the procedure of Example 1 was repeated except that an indium tin oxide (ITO) dispersion obtained by using fine ITO particles having an average particle diameter of 0.03 μm (available from Sumitomo Metal Mining Co., Ltd.; trade name: SUPP-HX) and by desalting them thoroughly by ion exchange was added in the above dispersion of noble-metal-coated fine silver particles to finally obtain a transparent electro-conductive layer forming-coating fluid in which the noble-metal-coated fine silver particles and the fine ITO particles were dispersed (Ag: 0.294%; Au: 0.049%; ITO: 0.1%; water: 9.7%; EA: 84.95%; DAA: 4.9%), a silica sol having a weight-average molecular weight of 1,920 was used and diluted so as to have the $SiO_2$ (silicon oxide) solid content in a concentration of 0.8%, a glass substrate heated to 35° C. was used and the transparent electro-conductive layer forming coating fluid and the silica sol were spin-coated under conditions of 150 rpm for 60 seconds, followed by hardening at 210° C. for 20 minutes. Thus, a glass substrate provided with a transparent double-layer film constituted of a transparent electro-conductive layer containing the noble-metal-coated fine silver particles and fine ITO particles and a transparent coat layer formed of a silicate film composed chiefly of silicon oxide, i.e., a transparent electro-conductive structure according to Example 5 was obtained.

Figure 7:
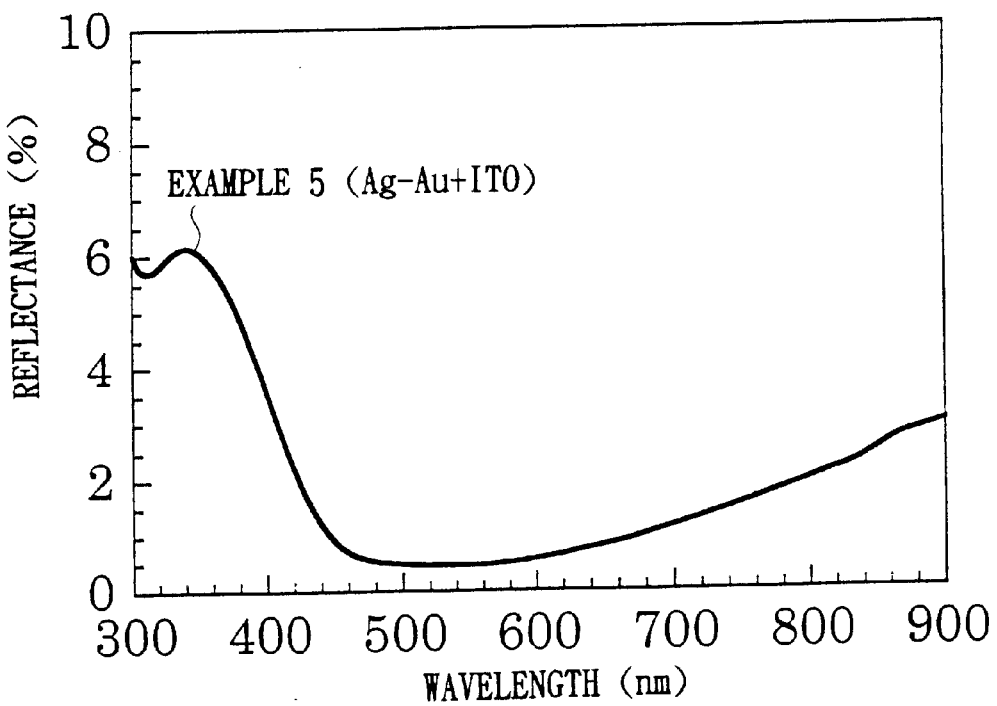
FIG. 7 is a graphical representation showing a reflection profile of a transparent electro-conductive structure according to Example 5.
Figure 8:
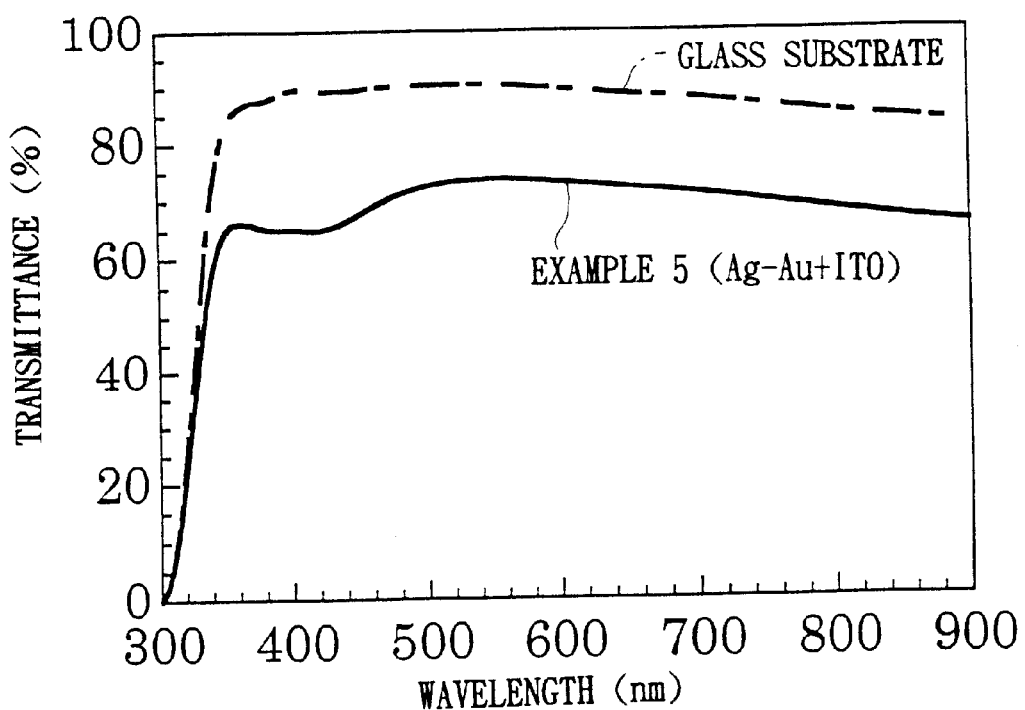
FIG. 8 is a graphical representation showing transmission profiles of the transparent electro-conductive structure according to Example 5 and a glass substrate which is a constituent member of this structure.

Film characteristics examined on the transparent double-layer film formed on the glass substrate are shown in Table 1 below. The reflection profile of the transparent electro-conductive structure thus produced according to Example 5 is shown in FIG. 7, and its transmission profile in FIG. 8.

EXAMPLE 6

Using a colloidal dispersion of fine silver particles which was made up in the same manner as in Example 1, and using 0.4 g of an aqueous 1% hydrazine solution and an aqueous potassium aurate solution (Au: 0.075%), a dispersion of noble-metal-coated fine silver particles having an average particle diameter of 7.1 nm was obtained.

Then, the procedure of Example 1 was repeated except that an antimony tin oxide (ATO) dispersion obtained by using fine ATO particles having an average particle diameter of 0.01 μm (available from Ishihara Sangyo Kaisha, Ltd.; trade name: SN-100P) and by desalting them thoroughly by ion exchange was added in the above dispersion of noble-metal-coated fine silver particles to finally obtain a transparent electro-conductive layer forming coating fluid in which the noble-metal-coated fine silver particles and the fine ATO particles were dispersed (Ag: 0.29%; Au: 0.048%; ATO: 0.174%; water: 11.0%; EA: 83.58%; DAA: 4.9%), a silica sol having a weight-average molecular weight of 1,920 was used and diluted so as to have the $SiO_2$ (silicon oxide) solid content in a concentration of 0.8%, a glass substrate heated to 35° C. was used and the transparent electro-conductive layer forming coating fluid and the silica sol were spin-coated under conditions of 150 rpm for 60 seconds, followed by hardening at 210° C. for 20 minutes. Thus, a glass substrate provided with a transparent double-layer film constituted of a transparent electro-conductive layer containing the noble-metal-coated fine silver particles and fine ATO particles and a transparent coat layer formed of a silicate film composed chiefly of silicon oxide, i.e., a transparent electro-conductive structure according to Example 6 was obtained.

Figure 9:
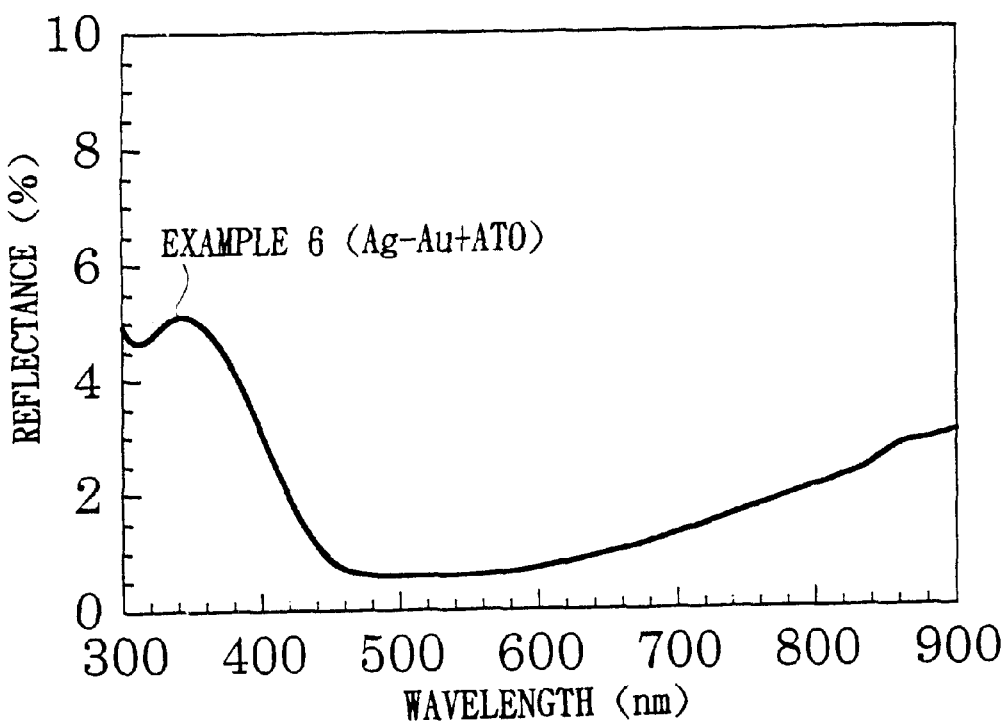
FIG. 9 is a graphical representation showing a reflection profile of a transparent electro-conductive structure according to Example 6.
Figure 10:
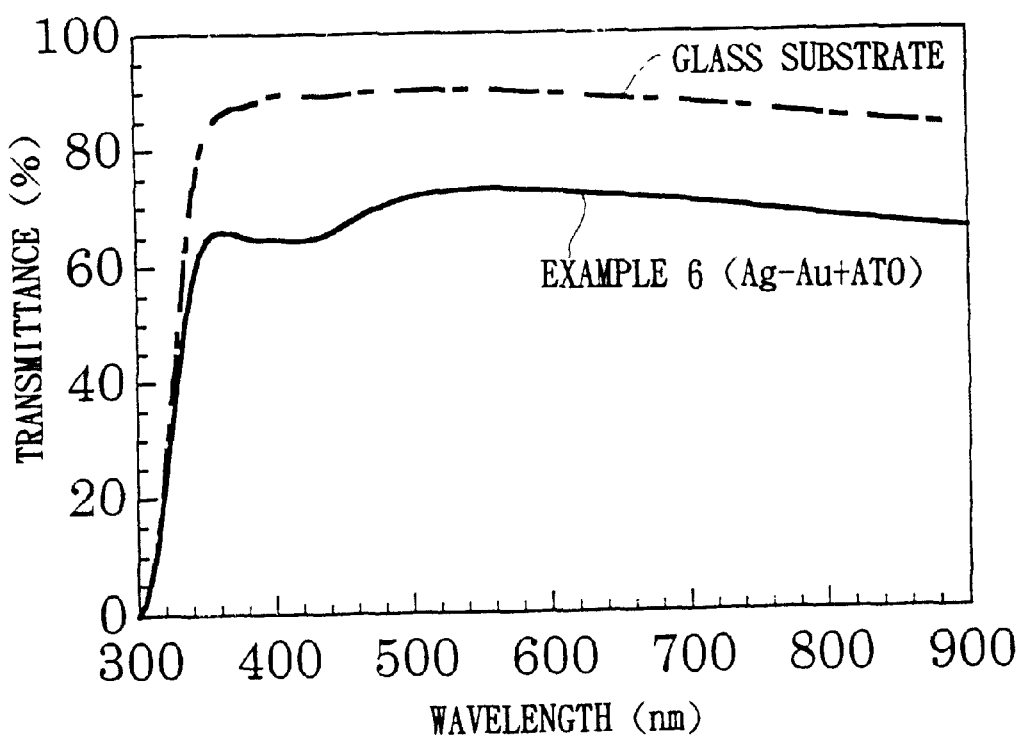
FIG. 10 is a graphical representation showing transmission profiles of the transparent electro-conductive structure according to Example 6 and a glass substrate which is a constituent member of this structure.

Film characteristics examined on the transparent double-layer film formed on the glass substrate are shown in Table 1 below. The reflection profile of the transparent electro-conductive structure thus produced according to Example 6 is shown in FIG. 9, and its transmission profile in FIG. 10.

EXAMPLE 7

Using a colloidal dispersion of fine silver particles which was made up in the same manner as in Example 1, the procedure of Example 1 was repeated except that 0.4 g of an aqueous 1% hydrazine solution and an aqueous potassium aurate solution (Au: 0.075%) were used to obtain a concentrated dispersion of noble-metal-coated fine silver particles, a solution containing a tetramer of tetramethyl-silicate (available from Colcoat Co., Ltd.; trade name: Methyl-silicate 51) as an inorganic binder was added thereto to obtain a transparent electro-conductive layer forming coating fluid in which noble-metal-coated fine silver particles having an average particle diameter of 7.0 nm were dispersed (Ag: 0.29%; Au: 0.052%; $SiO_2$: 0.02%; water: 8.78%; EA: 85.85; DAA: 5.0%), a silica sol having a weight-average molecular weight of 2,460 was used and diluted so as to have the $SiO_2$ (silicon oxide) solid content in a concentration of 0.7%, a glass substrate heated to 35° C. was used and the transparent electro-conductive layer forming coating fluid and the silica sol were spin-coated under conditions of 150 rpm for 60 seconds, followed by hardening at 210° C. for 20 minutes. Thus, a glass substrate provided with a transparent double-layer film constituted of a transparent electro-conductive layer containing the noble-metal-coated fine silver particles and a transparent coat layer formed of a silicate film composed chiefly of silicon oxide, i.e., a transparent electro-conductive structure according to Example 7 was obtained.

Film characteristics examined on the transparent double-layer film formed on the glass substrate are shown in Table 1 below.

EXAMPLE 8

To 33 g of an aqueous 9% silver nitrate solution, a mixed solution of 39 g of an aqueous 23% iron (II) sulfate solution and 48 g of an aqueous 37.5% sodium citrate solution was added, and thereafter the sediment formed was filtered and washed, followed by addition of pure water to make up a colloidal dispersion of fine silver particles (Ag: 0.49%). To 240 g of this colloidal dispersion of fine silver particles, 5 g of an aqueous 1% hydrazine monohydrate $N_2H_4.H_2O$ solution was added, and 200 g of an aqueous potassium platinate (IV) $K_2Pt(OH_6)$ solution (Pt: 0.06%) was further added with stirring to obtain a colloidal dispersion of noble-metal-coated fine silver particles coated with platinum alone. This colloidal dispersion of noble-metal-coated fine silver particles was subjected repeatedly to the step of concentrating it by ultrafiltration, adding pure water to the resultant concentrated solution and again concentrating it by ultrafiltration, to obtain a desalted concentrated dispersion. To this dispersion, ethanol (EA) and diacetone alcohol (DAA) were added to obtain a transparent electro-conductive layer forming coating fluid containing noble-metal-coated fine silver particles (Ag: 0.245%; Pt: 0.025%; water: 7.48%; EA: 87.25%; DAA: 5.0%). The transparent electro-conductive layer forming coating fluid thus obtained was observed on a transmission electron microscope to reveal that the noble-metal-coated fine silver particles had an average particle diameter of 9.2 nm.

Next, this transparent electro-conductive layer forming coating fluid was spin-coated (130 rpm, for 60 seconds) on a glass substrate (soda-lime glass of 3 mm thick) heated to 40° C., and thereafter subsequently a silica sol was spin-coated thereon (130 rpm, for 60 seconds), followed by hardening at 180° C. for 20 minutes to obtain a glass substrate provided with a transparent double-layer film constituted of a transparent electro-conductive layer containing the noble-metal-coated fine silver particles and a transparent coat layer formed of a silicate film composed chiefly of silicon oxide, i.e., a transparent electro-conductive structure according to Example 8.

Here, the above silica sol was made up using 19.6 parts of Methyl-silicate 51 (trade name; available from Colcoat Co., Ltd.), 57.8 parts of ethanol, 7.9 parts of an aqueous 1% nitric acid solution and 14.7 parts of pure water to obtain one having $SiO_2$ (silicon oxide) solid content in a concentration of 10%, which was finally diluted with a mixture of isopropyl alcohol (IPA) and n-butanol (NBA) (IPA/NBA=3/1) so as to have the $SiO_2$ solid content in a concentration of 0.65%.

Figure 11:
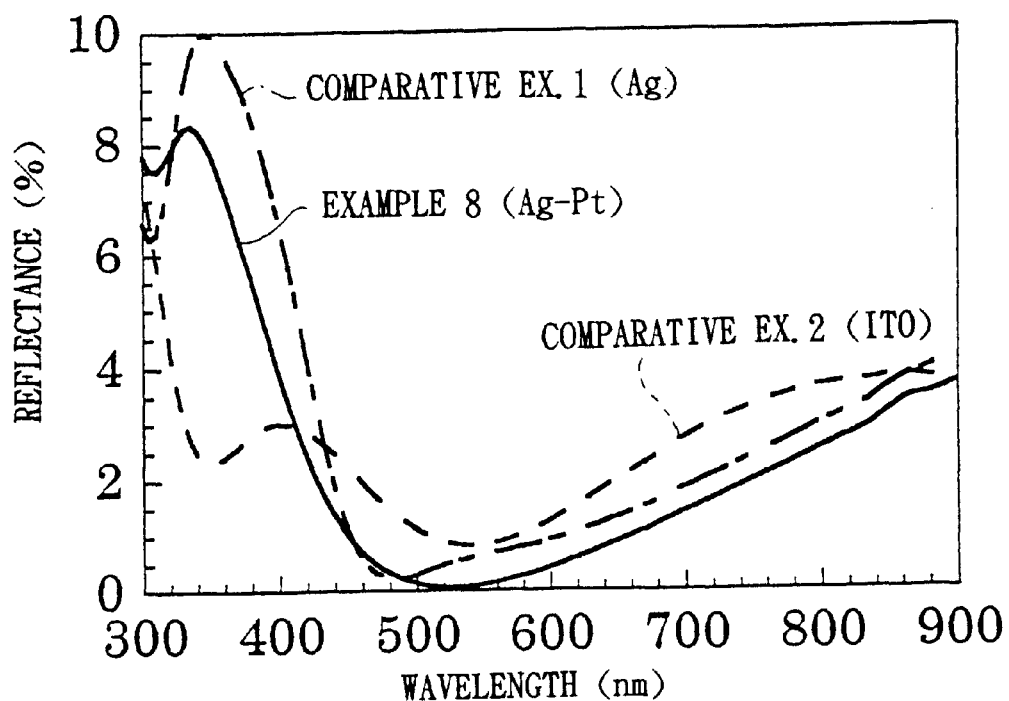
FIG. 11 is a graphical representation showing reflection profiles of transparent electro-conductive structures according to Example 8 and Comparative Examples 1 and 2.
Figure 12:
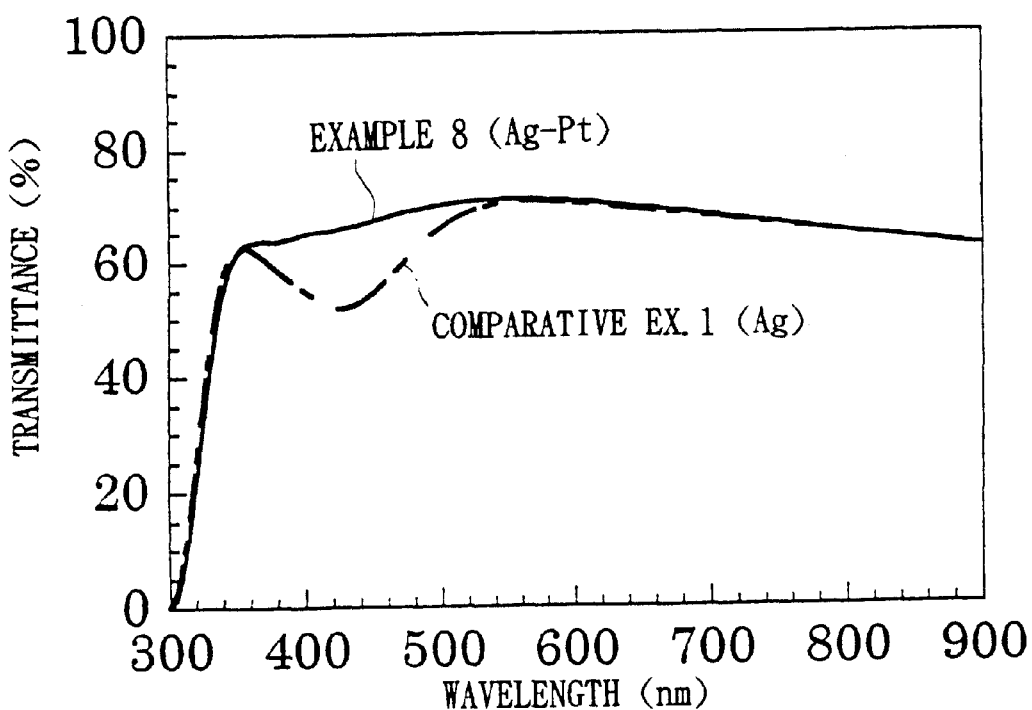
FIG. 12 is a graphical representation showing transmission profiles of transparent electro-conductive structures according to Example 8 and Comparative Example
Figure 13:
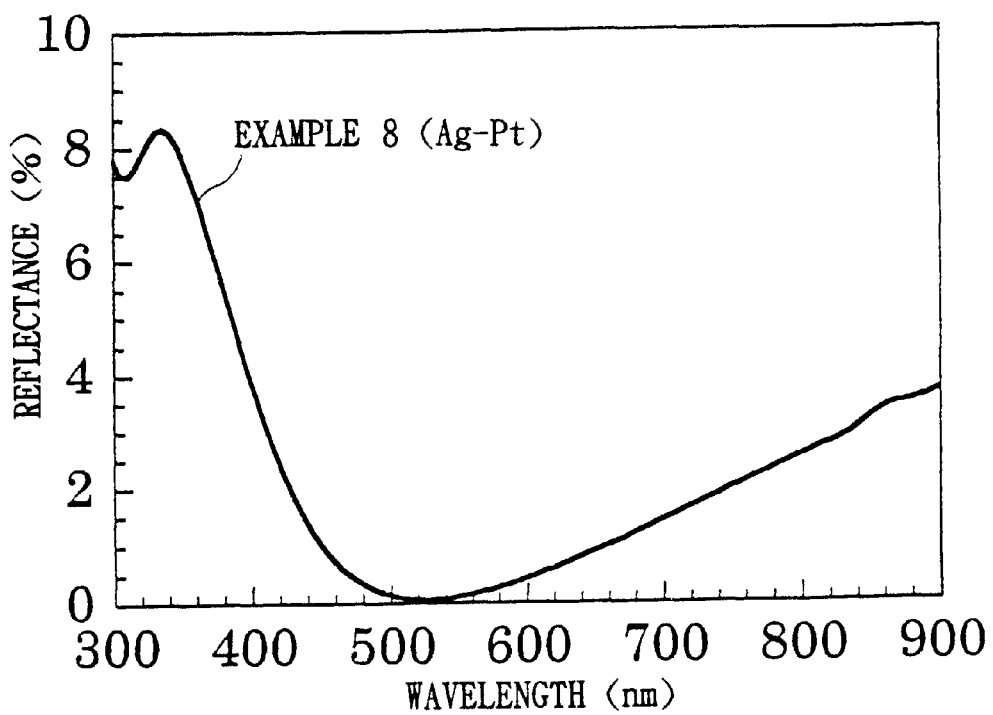
FIG. 13 is a graphical representation showing a reflection profile of a transparent electro-conductive structure according to Example 8.
Figure 14:
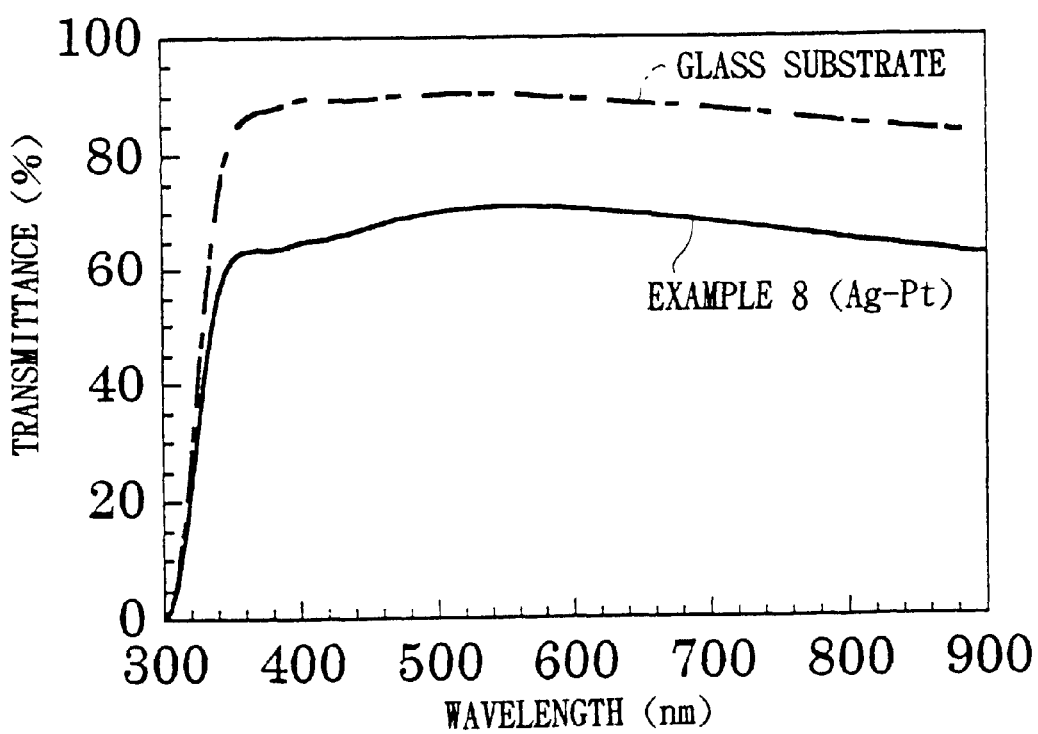
FIG. 14 is a graphical representation showing transmission profiles of the transparent electro-conductive structure according to Example 8 and a glass substrate which is a constituent member of this structure.

Film characteristics examined on the transparent double-layer film formed on the glass substrate are shown in Table 1 below. The reflection profile of the transparent electro-conductive structure thus produced according to Example 8 is shown in FIGS. 11 and 13, and its transmission profile in FIGS. 12 and 14 together.

EXAMPLE 9

Using a colloidal dispersion of fine silver particles which was made up in the same manner as in Example 8, the procedure of Example 8 was repeated except that 6.3 g of an aqueous 1% hydrazine monchydrate $N_2{}^1H_4.H_2O$ solution and a mixed solution of 121 g of an aqueous potassium aurate $KAU(OH_4)$ solution (Au: 0.098%) and 121 g of an aqueous potassium platinate $K_2Pt(OH_6)$ solution (Pt: 0.065%) were used to obtain a transparent electro-conductive layer forming coating fluid in which noble-metal-coated fine silver particles coated with a composite of gold and platinum and having an average particle diameter of 11.7 nm were dispersed (Ag: 0.26%; Au. 0.03%; Pt: 0.02%; water: 7.48%; EA: 87.2%; DAA: 5.0%). Thus, a glass substrate provided with a transparent double-layer film constituted of a-transparent electro-conductive layer containing the noble-metal-coated fine silver particles and a transparent coat layer formed of a silicate film composed chiefly of silicon oxide, i.e., a transparent electro-conductive structure according to Example 9 was obtained.

Figure 15:
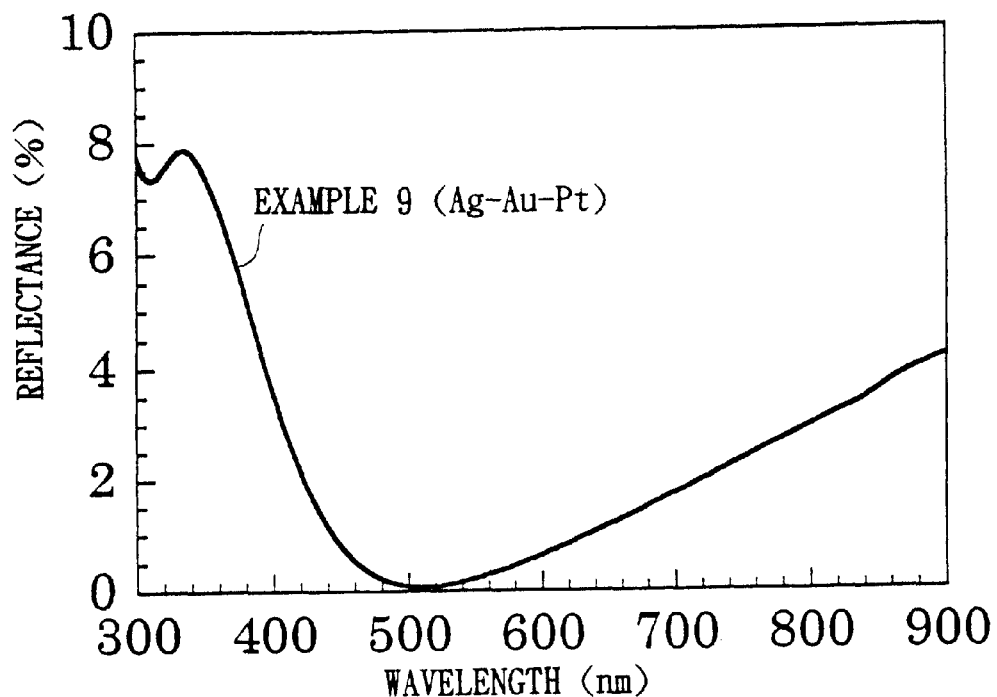
FIG. 15 is a graphical representation showing a reflection profile of a transparent electro-conductive structure according to Example 9.
Figure 16:
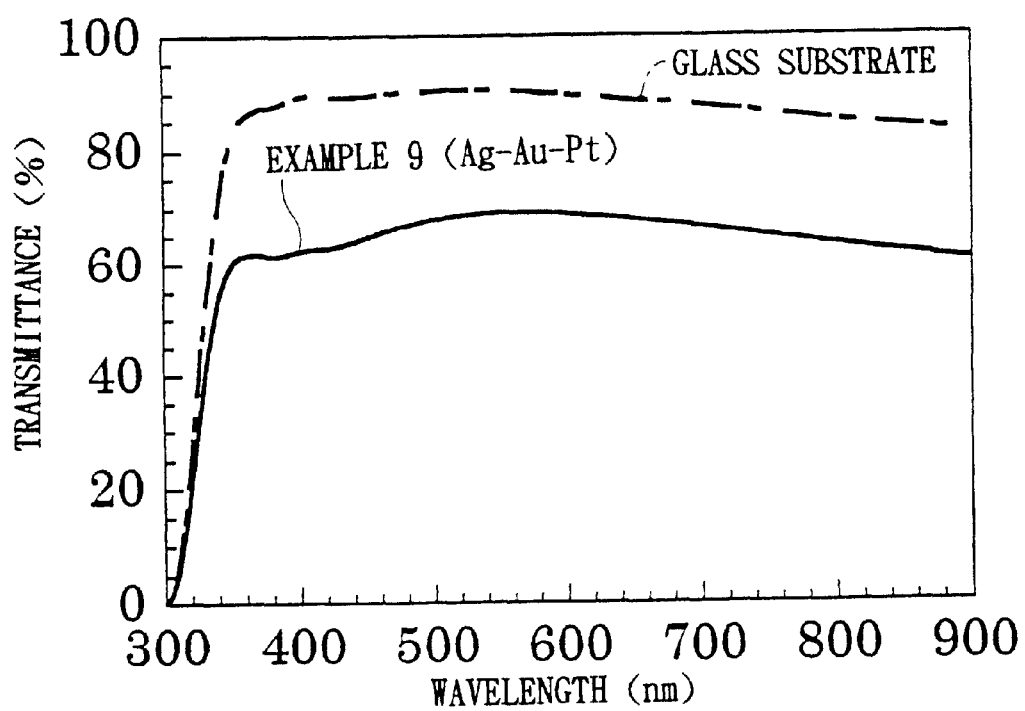
FIG. 16 is a graphical representation showing transmission profiles of the transparent electro-conductive structure according to Example 9 and a glass substrate which is a constituent member of this structure.

Film characteristics examined on the transparent double-layer film formed on the glass substrate are shown in Table 1 below. The reflection profile of the transparent electro-conductive structure according to Example 9 is shown in FIG. 15, and its transmission profile in FIG. 16.

EXAMPLE 10

Using a colloidal dispersion of fine silver particles which was made up in the same manner as in Example 8, the procedure of Example 8 was repeated except that, without addition of the reducing agent aqueous hydrazine solution, 203 g of an aqueous potassium platinate $K_2Pt(OH_6)$ solution (Pt: 0.064%) was added with stirring to effect displacement reaction between platinum and silver to obtain a transparent electro-conductive layer forming coating fluid in which the noble-metal-coated fine silver particles coated with platinum and having an average particle diameter of 9.2 nm were dispersed (Ag: 0.24%; Pt: 0.025%; water: 9.2%; EA: 85.53%; DAA: 5.0%). Thus, a glass substrate provided with a transparent double-layer film constituted of a transparent electro-conductive layer containing the noble-metal-coated fine silver particles and a transparent coat layer formed of a silicate film composed chiefly of silicon oxide, i.e., a transparent electro-conductive structure according to Example 10 was obtained.

Film characteristics examined on the transparent double-layer film formed on the glass substrate are shown in Table 1 below.

EXAMPLE 11

Using 240 g of a colloidal dispersion of fine silver particles (Ag: 0.49%) which was made up in the same manner as in Example 8, without addition of the reducing agent aqueous hydrazine solution, 203 g of an aqueous potassium platinate $K_2Pt(OH)_6$ solution (Pt: 0.064%) was added with stirring to effect displacement reaction between platinum and silver to obtain a dispersion of noble-metal-coated fine silver particles coated with platinum and having an average particle diameter of 9.2 nm.

Then, the procedure of Example 8 was repeated except that an indium tin oxide (ITO) dispersion obtained by using fine ITO particles having an average particle diameter of 0.03 μm (available from Sumitomo Metal Mining Co., Ltd.; trade name: SUFP-HX) and by desalting them thoroughly by ion exchange was added in the above dispersion of noble-metal-coated fine silver particles to finally obtain a transparent electro-conductive layer forming coating fluid in which the noble-metal-coated fine silver particles and the fine ITO particles were dispersed (Ag. 0.312%; Pt: 0.0325%; ITO: 0.12%; water: 12.3%; EA: 87.23%; DAA: 0%), a silica sol having a weight-average molecular weight of 1,920 was used and diluted so as to have. the $SiO_2$ (silicon oxide) solid content in a concentration of 0.8%, a glass substrate heated to 35° C. was used and the transparent electro-conductive layer forming coating fluid and the silica sol were spin-coated under conditions of 150 rpm for 60 seconds, followed by hardening at 210° C. for 20 minutes. Thus, a glass substrate provided with a transparent double-layer film constituted of a transparent electro-conductive layer containing the noble-metal-coated fine silver particles and fine ITO particles and a transparent coat layer formed of a silicate film composed chiefly of silicon oxide, i.e., a transparent electro-conductive structure according to Example 11 was obtained.

Figure 17:
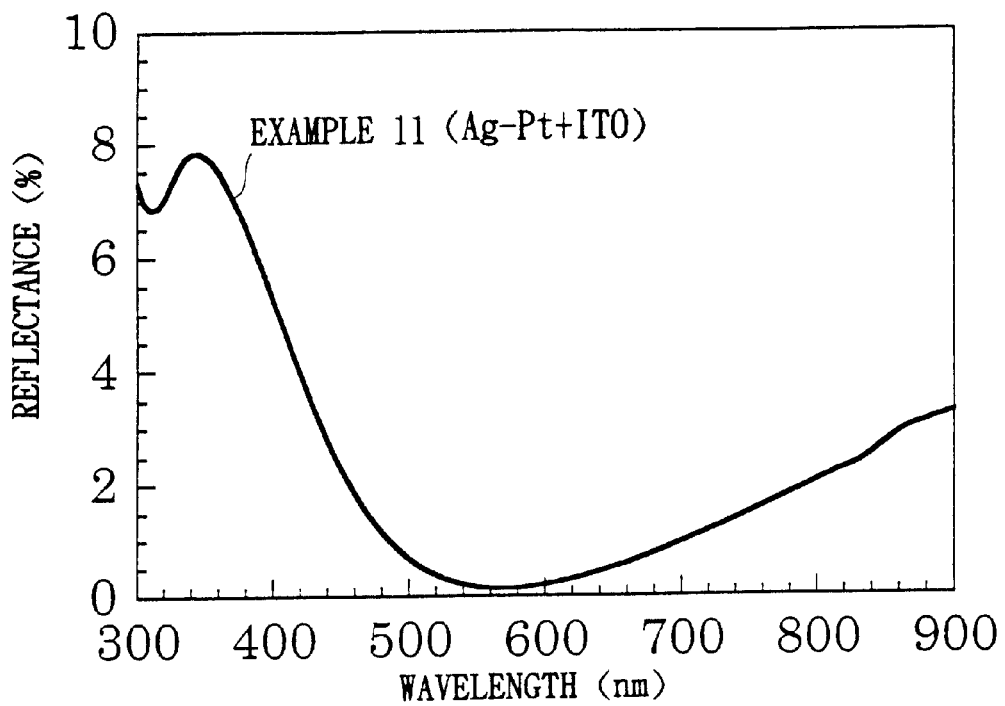
FIG. 17 is a graphical representation showing a reflection profile of a transparent electro-conductive structure according to Example 11.
Figure 18:
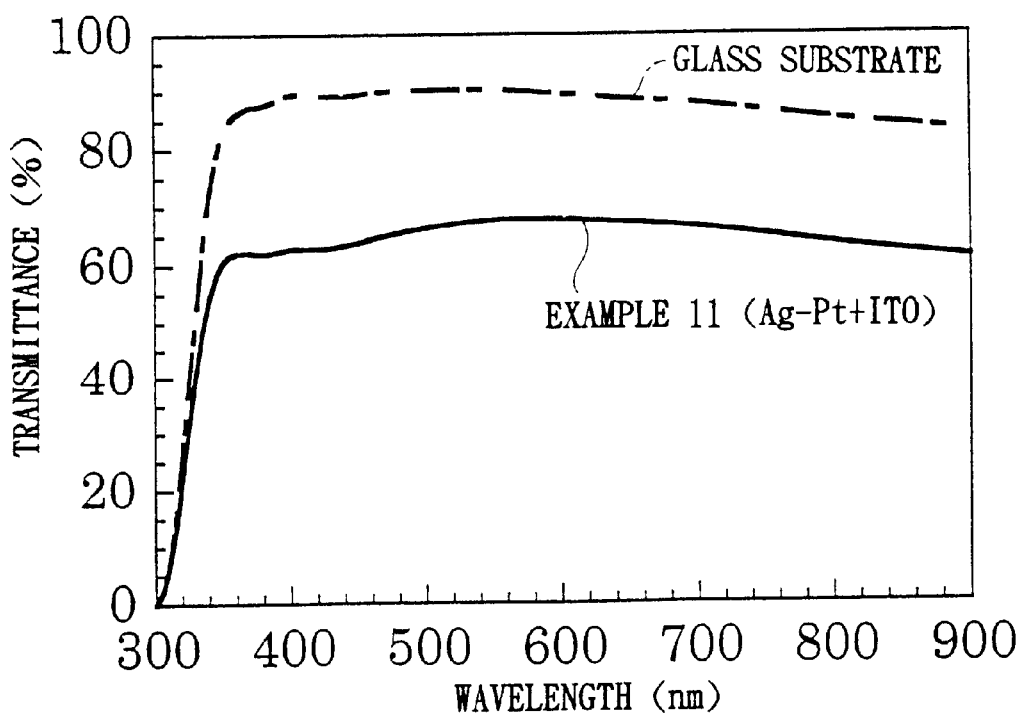
FIG. 18 is a graphical representation showing transmission profiles of the transparent electro-conductive structure according to Example 11 and a glass substrate which is a constituent member of this structure.

Film characteristics examined on the transparent double-layer film formed on the glass substrate are shown in Table 1 below. The reflection profile of the transparent electro-conductive structure according to Example 11 is shown in FIG. 17, and its transmission profile in FIG. 18.

Comparative Example 1

Using a colloidal dispersion of fine silver particles which was made up in the same manner as in Example 1, the procedure of Example 1 was repeated except that the fine silver particles were not coated with gold to obtain a transparent electro-conductive layer forming coating fluid in which fine silver particles having an average particle diameter of 6.9 nm were dispersed (Ag: 0.3%; water: 4.0%; EA: 90.7%; DAA: 5.0%). Thus, a glass substrate provided with a transparent double-layer film constituted of a transparent electro-conductive layer containing the fine silver particles and a transparent coat layer formed of a silicate film composed chiefly of silicon oxide, i.e., a transparent electro-conductive structure according to Comparative Example 1 was obtained.

Film characteristics examined on the transparent double-layer film formed on the glass substrate are shown in Table 1 below. The reflection profile of the transparent electro-conductive structure according to Comparative Example 1 is shown in FIGS. 1 and 11, and its transmission profile in FIGS. 2 and 12.

Comparative Example 2

A transparent electro-conductive layer forming coating fluid prepared by dispersing in a solvent fine ITO particles having an average particle diameter of 30 nm (available from Sumitomo Metal Mining Co., Ltd.; trade name: SDA-104; ITO: 2%) was spin-coated (150 rpm, for 60 seconds) on a glass substrate (soda-lime glass of 3 mm thick) heated to 40° C., and thereafter subsequently a silica sol diluted so as to have $SiO_2$ (silicon oxide) solid content in a concentration of 1.0% was spin-coated thereon (150 rpm, for 60 seconds), followed by hardening at 180° C. for 30 minutes to obtain a glass substrate provided with a transparent double-layer film constituted of a transparent electro-conductive layer containing the fine ITO particles and a transparent coat layer formed of a silicate film composed chiefly of silicon oxide, i.e., a atransparent electro-conductive structure according to Comparative Example 2.

Film characteristics examined on the transparent double-layer film formed on the glass substrate are shown in Table 1 below. The reflection profile of the transparent electro-conductive structure according to Comparative Example 2 is shown in FIGS. 1 and 11.

TABLE 1

| | Type of fine particles | *1 Noble metal coating weight (pbw) | Surface resistance (Ω/□) | Visible light ray transmittance (%) | *2 Transmittance standard deviation | Haze (%) | Bottom reflectance/ bottom wavelength (%/nm) |
|---|---|---|---|---|---|---|---|
| Example: | | | | | | | |
| 1 | Ag—Au | 26.0 | 490 | 72.7 | 3.29 | 0 | 0.1/515 |
| 2 | Ag—Au | 35.6 | 390 | 69.4 | 2.00 | 0.1 | 0.05/495 |
| 3 | Ag—Au | 11.7 | 395 | 72.5 | 2.72 | 0.1 | 0.08/505 |
| 4 | Ag—Au | 10.2 | 473 | 73.1 | 4.89 | 0 | 0.08/510 |
| 5 | Ag—Au + ITO | 16.7 | 456 | 74.8 | 3.01 | 0.4 | 0.46/540 |
| 6 | Ag—Au + ATO | 16.6 | 534 | 74.2 | 3.04 | 0.2 | 0.61/530 |
| 7 | Ag—Au | 17.9 | 313 | 71.2 | 2.40 | 0 | 0.02/465 |
| 8 | Ag—Pt | 10.2 | 658 | 71.6 | 2.31 | 0 | 0.07/525 |
| 9 | Ag—Au—Pt | 19.2 | 553 | 70.4 | 2.48 | 0.1 | 0.08/510 |
| 10 | Ag—Pt | 10.4 | 728 | 70.0 | 2.35 | 0.1 | 0.07/525 |
| 11 | Ag—Pt + ITO | 10.4 | 457 | 69.7 | 1.75 | 0.4 | 0.15/570 |

TABLE 1-continued

| | Type of fine particles | *1 Noble metal coating weight (pbw) | Surface resistance (Ω/□) | Visible light ray transmittance (%) | *2 Transmittance standard deviation | Haze (%) | Bottom reflectance/ bottom wavelength (%/nm) |
|---|---|---|---|---|---|---|---|
| Comparative Example: | | | | | | | |
| 1 | Ag | — | 980 | 70.9 | 6.67 | 0.1 | 0.23/485 |
| 2 | ITO | — | 16,000 | 93.3 | — | 0.2 | 0.83/540 | pbw: parts by weight
*1 Coating weight of the gold or platinum alone or composite of gold and platinum (noble metal) based on 100 parts by weight of silver.
*2 Value with respect to the transmittance (%) of only the transparent double-layer film, excluding the transparent substrate, at each wavelength plotted at intervals of 5 nm of wavelength region (380 to 780 nm) of visible light rays.

Weatherability Test

The transparent electro-conductive structures according to Examples 1 to 11 and the transparent electro-conductive structure according to Comparative Example 1 were immersed in 5% brine to examine any changes of the surface resistance and film appearance of the transparent double-layer film provided on the transparent substrate (glass substrate) of each structure. The results are shown in Table 2 below.

TABLE 2

| | | Surface resistance | | |
|---|---|---|---|---|
| | | Initial value (Ω/□) | Value after immersion in 5% brine | Appearance of double-layer film (transmittance, haze, reflection) |
| Example: | | | | |
| | 1 | 490 | No change in surface resistance on immersion for 24 hr. | No changes in transmittance, haze and reflection profile on immersion for 24 hr. |
| | 2 | 390 | No change in surface resistance on immersion for 24 hr. | No changes in transmittance, haze and reflection profile on immersion for 24 hr. |
| | 3 | 395 | No change in surface resistance on immersion for 3 hr. Surface resistance changed to 3.1 kΩ/□ on immersion for 24 hr. | No changes in transmittance, haze and reflection profile on immersion for 1 hr. A slight change in reflection color on immersion for 24 hr. |
| | 4 | 473 | No change in surface resistance on immersion for 3 hr. Surface resistance changed to 620 Ω/□ on immersion for 24 hr. | No changes in transmittance, haze and reflection profile on immersion for 1 hr. A slight change in reflection color on immersion for 24 hr. |
| | 5 | 456 | No change in surface resistance on immersion for 24 hr. | No changes in transmittance, haze and reflection profile on immersion for 24 hr. |
| | 6 | 534 | No change in surface resistance on immersion for 24 hr. | No changes in transmittance, haze and reflection profile on immersion for 24 hr. |
| | 7 | 313 | No change in surface resistance on immersion for 24 hr. | No changes in transmittance, haze and reflection profile on immersion for 24 hr. |
| | 8 | 658 | No change in surface resistance on immersion for 6 hr. Surface resistance changed to 755 Ω/□ on immersion for 24 hr. | No changes in transmittance, haze and reflection profile on immersion for 6 hr. A slight change in reflection color on immersion for 24 hr. |
| | 9 | 553 | No change in surface resistance on immersion for 24 hr. | No changes in transmittance, haze and reflection profile on immersion for 24 hr. |
| | 10 | 728 | No change in surface resistance on immersion for 6 hr. Surface resistance changed to 1,031 Ω/□ on immersion for 24 hr. | No changes in transmittance, haze and reflection profile on immersion for 6 hr. A slight change in reflection color on immersion for 24 hr. |
| | 11 | 457 | No change in surface resistance on immersion for 24 hr. | No changes in transmittance, haze and reflection profile on immersion for 24 hr. |
| Comparative Example: | | | | |
| | 1 | 980 | Surface resistance changed to >1,000,000 Ω/□ on immersion for 15 min to become unmeasurable. | Haze increased on immersion for 30 min. Transparent double-layer film peeled partly on immersion for 10 hr. |

Evaluation (1) As can be seen from the results shown in Table 1, the values of surface resistance ($\Omega/\square$) and standard deviation of transmittance of the transparent double-layer film according to each Example are confirmed to have been greatly improved, compared with the values of the transparent double-layer film according to each Comparative Example. As also can be seen from the comparison of the transmission profiles of the transparent electro-conductive structures according to Examples 1 and 8 with the transmission profiles of the transparent electro-conductive structure according to Comparative Example 1 as shown in FIGS. 2 and 12, very flat transmission profiles are confirmed to be attained in the transparent electro-conductive structures of Examples 1 and 8.

As can be seen from the reflection profiles shown in FIGS. 1 and 11, the transparent electro-conductive structures of Examples 1 and 8 are also confirmed to be improved also in reflection characteristics in the visible light ray wavelength region, compared with those of Comparative Examples 1 and 2.

(2) As can be seen from the results shown in Table 2, the transparent double-layer film according to each Example is confirmed to be greatly improved in weatherability, compared with the transparent double-layer film of Comparative Example 1.

(3) As can be confirmed from Table 1, in comparison of the visible light ray transmittance of the transparent electro-conductive structures according to Examples 1 to 7, in which the noble-metal-coated fine silver particles coated with gold alone are used, the visible light ray transmittance of Examples 5 and 6, incorporated with ITO and ATO, respectively, shows higher values than that of other Examples.

On the other hand, as can be confirmed from Table 1, in comparison of the surface resistance of the transparent electro-conductive structures according to Examples 8 to 11, in which the noble-metal-coated fine silver particles coated with gold or platinum alone or composite of gold and platinum are used, Example 11, incorporated with ITO, shows the smallest value and also, in respect of the visible light ray transmittance, these Examples show substantially the same values. That is, this indicates that in Example 11 the transparent electro-conductive layer can be made to have a higher visible light ray transmittance than that in Examples 8 to 10 when the transparent electro-conductive layer is made to have a thickness set smaller so as to have substantially the same surface resistance as that in Examples 8 to 10.

From these facts, it is confirmed that an improvement of film transmittance in the transparent electro-conductive layer can be achieved when the conductive fine oxide particles of ITO or ATO are incorporated in the transparent electro-conductive layer.

(4) In Examples 1 to 11, the noble-metal-coated fine silver particles are made using potassium aurate and potassium platinate as the aurate and platinate, respectively. In place of these potassium aurate and potassium platinate, experiments have also been made using sodium aurate and sodium platinate.

The same evaluation tests as in Examples 1 to 11 have been made also in respect of noble-metal-coated fine silver particles obtained using the sodium aurate and sodium platinate, and the same evaluation results as those have been confirmed to be obtainable.

What is claimed is:

1. A process for preparing a transparent electro-conductive layer forming coating fluid used in the production of a transparent electro-conductive structure having a transparent substrate and formed successively thereon a transparent electro-conductive layer and a transparent coat layer; the process comprising;

a noble-metal-coated fine silver particle making step of adding to a colloidal dispersion of fine silver particles
  i) a reducing agent and at least one of an alkali metal aurate solution and an alkali metal platinate solution or
  ii) a reducing agent and a solution of mixture of an alkali metal aurate and an alkali metal platinate, to coat gold or platinum alone or a composite of gold and platinum on the surfaces of the fine silver particles to obtain a colloidal dispersion of noble-metal-coated fine silver particles;

a desalting and concentrating step of subjecting the colloidal dispersion of noble-metal-coated fine silver particles to desalting treatment to lower its electrolyte concentration and to concentrating treatment to concentrate the colloidal dispersion, to obtain a concentrated dispersion of noble-metal-coated fine silver particles; and a solvent mixing step of adding to the concentrated dispersion of noble-metal-coated fine silver particles a solvent alone or a solvent containing at least one of conductive fine oxide particles and an inorganic binder, to obtain the transparent electro-conductive layer forming coating fluid.

2. The process for preparing a transparent electro-conductive layer forming coating fluid according to claim 1, wherein the reducing agent used in said noble-metal-coated fine silver particle making step is hydrazine.

3. The process for preparing a transparent electro-conductive layer forming coating fluid according to claim 1, wherein the alkali metal aurate and alkali metal platinate used in said noble-metal-coated fine silver particle making step are potassium aurate or sodium aurate, and potassium platinate or sodium platinate, respectfully.

4. The process for preparing a transparent electro-conductive layer forming coating fluid according to claim 1, wherein, in said noble-metal-coated fine silver particle making step, the colloidal dispersion of fine silver particles and at least one of the alkali metal aurate soluton and the alkali metal platinate solution of the solution of mixture of an alkali metal aurate and an alkali metal platinate are mixed in a proportion so controlled that, in the noble-metal-coated fine silver particles, the gold or platinum alone or composite of gold and platinum is in a coating weight set within the range of from 5 parts by weight to 100 parts by weight based on 100 parts by weight of silver.

5. The process for preparing a transparent electro-conductive layer forming coating fluid according to claim 2, wherein the alkali metal aurate and alkali metal platinate used in said noble-metal-coated fine silver particle making step are potassium aurate or sodium aurate, and potassium platinate or sodium platinate, respectfully.

6. The process for preparing a transparent electro-conductive layer forming coating fluid according to claim 2, wherein, in said noble-metal-coated fine silver particle making step, the colloidal dispersion of fine silver particles and at least one of the alkali metal aurate soluton and the alkali metal platinate solution of the solution of mixture of an alkali metal aurate and an alkali metal platinate are mixed in a proportion so controlled that, in the noble-metal-coated fine silver particles, the gold or platinum alone or composite of gold and platinum is in a coating weight set within the range of from 5 parts by weight to 100 parts by weight based on 100 parts by weight of silver.

7. The process for preparing a transparent electro-conductive layer forming coating fluid according to claim 3, wherein, in said noble-metal-coated fine silver particle making step, the colloidal dispersion of fine silver particles and at least one of the alkali metal aurate soluton and the alkali metal platinate solution of the solution of mixture of an alkali metal aurate and an alkali metal platinate are mixed in a proportion so controlled that, in the noble-metal-coated fine silver particles, the gold or platinum alone or composite of gold and platinum is in a coating weight set within the range of from 5 parts by weight to 100 parts by weight based on 100 parts by weight of silver.

8. A process for preparing a transparent electro-conductive layer forming coating fluid used in the production of a transparent electro-conductive structure having a transparent substrate and formed successively thereon a transparent electro-conductive layer and a transparent coat layer; the process comprising;

a noble-metal-coated fine silver particle making step of adding to a colloidal dispersion of fine silver particles i) at least one of an alkali metal aurate solution and an alkali metal platinate solution or ii) a solution of mixture of an alkali metal aurate and an alkali metal platinate, to coat gold or platinum alone or a composite of gold and platinum on the surfaces of the fine silver particles by the aid of displacement reaction caused by a difference in ionization tendency between silver, gold and platinum, to obtain a colloidal dispersion of noble-metal-coated fine silver particles;

a desalting and concentrating step of subjecting the colloidal dispersion of noble-metal-coated fine silver particles to desalting treatment to lower its electrolyte concentration and to concentrating treatment to concentrate the colloidal dispersion, to obtain a concentrated dispersion of noble-metal-coated fine silver particles; and a solvent mixing step of adding to the concentrated dispersion of noble-metal-coated fine silver particles a solvent alone or a solvent containing at least one of conductive fine oxide particles and an inorganic binder, to obtain the transparent electro-conductive layer forming coating fluid.

9. The process for preparing a transparent electro-conductive layer forming coating fluid according to claim 8, wherein the alkali metal aurate and alkali metal platinate used in said noble-metal-coated fine silver particle making step are potassium aurate or sodium aurate, and potassium platinate or sodium platinate, respectfully.

10. The process for preparing a transparent electro-conductive layer forming coating fluid according to claim 8, wherein, in said noble-metal-coated fine silver particle making step, the colloidal dispersion of fine silver particles and at least one of the alkali metal aurate soluton and the alkali metal platinate solution of the solution of mixture of an alkali metal aurate and an alkali metal platinate are mixed in a proportion so controlled that, in the noble-metal-coated fine silver particles, the gold or platinum alone or composite of gold and platinum is in a coating weight set within the range of from 5 parts by weight to 100 parts by weight based on 100 parts by weight of silver.

* * * * *